(12) United States Patent
Espiau et al.

(10) Patent No.: US 7,830,092 B2
(45) Date of Patent: Nov. 9, 2010

(54) ELECTRODELESS LAMPS WITH EXTERNALLY-GROUNDED PROBES AND IMPROVED BULB ASSEMBLIES

(75) Inventors: Frederick M. Espiau, Topanga, CA (US); Timothy J. Brockett, Oakland, CA (US); Mehran Matloubian, Encino, CA (US)

(73) Assignee: Topanga Technologies, Inc., Canoga Park, CA (US)

( * ) Notice: Subject to any disclaimer, the term of this patent is extended or adjusted under 35 U.S.C. 154(b) by 0 days.

(21) Appl. No.: 12/484,933

(22) Filed: Jun. 15, 2009

(65) Prior Publication Data

US 2009/0322240 A1    Dec. 31, 2009

Related U.S. Application Data

(60) Provisional application No. 61/075,735, filed on Jun. 25, 2008.

(51) Int. Cl.
*H01J 7/46* (2006.01)
(52) U.S. Cl. .......................... 315/39; 315/248
(58) Field of Classification Search ................ 315/39, 315/39.51, 248
See application file for complete search history.

(56) References Cited

U.S. PATENT DOCUMENTS

| | | | |
|---|---|---|---|
| 4,975,655 A | 12/1990 | Dawson et al. | |
| 5,637,963 A * | 6/1997 | Inoue et al. | 315/248 |
| 5,686,793 A | 11/1997 | Turner et al. | |
| 5,777,857 A | 7/1998 | Degelmann | |
| 5,834,895 A | 11/1998 | Dolan et al. | |
| 5,838,108 A | 11/1998 | Frank et al. | |
| 5,886,480 A | 3/1999 | Penzenstadler et al. | |
| 5,923,122 A | 7/1999 | Frank et al. | |
| 6,137,237 A * | 10/2000 | MacLennan et al. | 315/248 |
| 6,241,369 B1 | 6/2001 | Mackiewicz | |
| 6,617,806 B2 | 9/2003 | Kirkpatrick et al. | |
| 6,737,809 B2 | 5/2004 | Espiau et al. | |
| 6,922,021 B2 | 7/2005 | Espiau et al. | |
| 7,119,641 B2 | 10/2006 | Petrov et al. | |
| 7,291,985 B2 * | 11/2007 | Espiau et al. | 315/248 |
| 7,348,732 B2 | 3/2008 | Espiau et al. | |
| 7,350,936 B2 | 4/2008 | Ducharme et al. | |
| 7,358,678 B2 | 4/2008 | Espiau et al. | |
| 7,362,054 B2 | 4/2008 | Espiau et al. | |
| 7,362,055 B2 | 4/2008 | Espiau et al. | |
| 7,362,056 B2 | 4/2008 | Espiau et al. | |
| 7,372,209 B2 | 5/2008 | Espiau et al. | |

(Continued)

OTHER PUBLICATIONS

Bogaerts, et al., "Gas Discharge Plasmas and their Applications," Spectrochimica Acta, Part B 57, 2002, pp. 609-658.

(Continued)

*Primary Examiner*—Douglas W Owens
*Assistant Examiner*—Ephrem Alemu
(74) *Attorney, Agent, or Firm*—Townsend and Townsend and Crew LLP

(57) ABSTRACT

An electrode-less plasma lamps, comprising generally of a bulb containing a gas-fill that is excited to produce light using radio-frequency (RF) energy. In specific embodiments, the use of grounded coupling-elements with integrated bulb assemblies simplifies manufacturability, improves resonant frequency control, and enables the use of solid, partially filled, and hollow lamp bodies.

20 Claims, 16 Drawing Sheets

U.S. PATENT DOCUMENTS

| | | |
|---|---|---|
| 7,391,158 B2 | 6/2008 | Espiau et al. |
| 7,719,195 B2 * | 5/2010 | DeVincentis et al. .......... 315/39 |
| 2006/0250090 A9 | 11/2006 | Guthrie |
| 2008/0054813 A1 | 3/2008 | Espiau et al. |

OTHER PUBLICATIONS

International Search Report and Written Opinion of PCT Application No. PCT/US2009/048174, dated Aug. 17, 2009, 17 pages total.

* cited by examiner

ELECTRODELESS LAMPS WITH EXTERNALLY-GROUNDED PROBES AND IMPROVED BULB ASSEMBLIES

CROSS-REFERENCES TO RELATED APPLICATIONS

This application claims priority to U.S. Provisional Patent Application No. 61/075,735, filed Jun. 25, 2008, entitled "ELECTRODELESS LAMPS WITH EXTERNALLY-GROUNDED PROBES AND IMPROVED BULB ASSEMBLIES" by inventors FREDERICK M. ESPIAU, et al., commonly assigned and incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to devices and methods for generating light with plasma lamps. More particularly, the present invention provides plasma lamps driven by a radio-frequency source without the use of electrodes inside a gas-filled vessel (bulb) and related methods. Merely by way of example, such plasma lamps can be applied to applications such as stadiums, security, parking lots, military and defense, streets, large and small buildings, vehicle headlamps, aircraft landing, bridges, warehouses, uv water treatment, agriculture, architectural lighting, stage lighting, medical illumination, microscopes, projectors and displays, any combination of these, and the like.

Plasma lamps provide extremely bright, broadband light, and are useful in applications such as general illumination, projection systems, and industrial processing. The typical plasma lamp manufactured today contains a mixture of gas and trace substances that is excited to form a plasma using a high current passed through closely-spaced electrodes. This arrangement, however, suffers from deterioration of the electrodes, and therefore a limited lifetime.

Electrodeless plasma lamps driven by microwave sources have been proposed in the prior art. Conventional configurations include a plasma fill encased either in a bulb or a sealed recess within a dielectric body forming a waveguide, with microwave energy being provided by a source such as a magnetron and introduced into the waveguide and heating the plasma resistively. Another example is provided by U.S. Pat. No. 6,737,809 B2 (Espiau et. al.), which shows a different arrangement that has limitations. Espiau et. al. shows a plasma-enclosing bulb and a dielectric cavity forming a part of a resonant microwave circuit with a microwave amplifier to provide excitation. Several drawbacks, however, exist with Espiau et al. The dielectric cavity is a spatially positioned around a periphery of the plasma-enclosing bulb in an integrated configuration, which physically blocks a substantial portion of the electromagnetic radiation in the form of light emitted from the bulb particularly in the visible region. Additionally, the integrated configuration is generally difficult to manufacture and limits the operation and reliability of the plasma-enclosing bulb. These and other limitations of conventional techniques may be further described throughout the present specification and more particularly below.

From above, it is seen that techniques for improved lighting are highly desired.

BRIEF SUMMARY OF THE INVENTION

According to the present invention, techniques directed to devices and methods for generating light with plasma lamps are provided. More particularly, the present invention provides plasma lamps driven by a radio-frequency source without the use of electrodes and related methods. Merely by way of example, such plasma lamps can be applied to applications such as stadiums, security, parking lots, military and defense, streets, large and small buildings, bridges, warehouses, agriculture, uv water treatment, architectural lighting, stage lighting, medical illumination, microscopes, projectors and displays, any combination of these, and the like.

In a specific embodiment, the plasma electrodeless lamp comprises a dielectric body substantially covered with a conductive outer coating, closely receiving two coupling elements, the input coupling-element (RF-source coupling-element) connected to the output of an RF amplifier, and the feedback coupling-element connected to the input of an RF amplifier. The input coupling-element is conductively connected (grounded) to the conductive coating of the lamp body at its top surface, while the feedback coupling-element is not. The lamp further comprises a bulb/output coupling-element assembly, the assembly being grounded to the conductive coating of the lamp body at is bottom surface. Electromagnetic energy is RF-coupled between the input coupling-element and the bulb/output coupling-element assembly, and between the bulb/output coupling-element assembly and the feedback coupling-element. Electromagnetic energy is capacitively, or inductively or a combination of inductively and capacitively coupled to the bulb within the bulb/output coupling-element assembly. The lamp may further comprise a reflector to direct the luminous output of the bulb in the bulb/output coupling-element assembly. Alternatively, it may not. The lamp further comprises a ground strap to conductively connect the top of the bulb/output coupling-element assembly to the conductive outer coating of the lamp body. Alternatively, the ground strap may conductively connect the top of the bulb/output coupling-element assembly to the reflector, which in turn is conductively connected to the lamp body.

In another embodiment, the second coupling element is removed, and the first coupling element is connected to the output of an RF source, which may further comprise an RF oscillator and amplifier.

In yet another embodiment, the lamp body comprises a metallic conductive body that is partially filled with a dielectric insert.

In yet another embodiment, the lamp body comprises a metallic conductive body that is substantially hollow, with no dielectric insert.

In yet another embodiment, the bulb/output coupling-element assembly within the plasma electrodeless lamp comprises a single or multi-sectioned body. In a first section, a first coupling-element comprising a solid conductor is closely received but not wholly enclosed by a dielectric body. A portion of the first section may be conductively coated. In a second section, a gas-filled vessel (bulb) is closely received by a dielectric body; the gas-filled vessel may or may not be wholly enclosed by the dielectric body. In a third section, a second coupling-element comprising a solid conductor is closely received but not wholly enclosed by a dielectric body. A portion of the third section may be conductively coated. No DC conduction path exists between the first and third sections; electromagnetic energy is capacitively or inductively or a combination of capacitively and inductively coupled between them through the second section.

In yet another aspect, the first and second coupling-elements comprise dielectric material coated with a conductive veneer, and the gas-filled vessel is partially but closely received by the center dielectric portion of the first and second coupling-element. No DC conduction path exists between the first and second coupling-elements; electromagnetic energy is capacitively or inductively or a combination of capacitively and inductively coupled between them through gas-filled vessel.

In a specific embodiment, the present invention provides an electrodeless plasma lamp. The lamp has a conductive housing having a spatial volume defined within the conductive housing. In a specific embodiment, the spatial volume having an inner region and an outer region within the conductive housing. The lamp has a support body having an outer surface region disposed within or partially within the inner region of the spatial volume of the conductive housing and a conductive material overlying the outer surface region of the support body. The lamp has a gas-filled vessel having a transparent or translucent body having an inner surface and an outer surface and a cavity formed within the inner surface. In a specific embodiment, the lamp can also include both a transparent and translucent portion. The gas-filled vessel comprises a first end region and a second end region and a length defined between the first end region and the second end region. A first coupling-element (bulb/output coupling-element) is coupled to the first end region of the gas-filled vessel. The first coupling-element is electrically coupled to the conductive material. A second coupling-element is coupled to the second end region of the gas filled vessel. An RF source coupling-element is spatially disposed within the outer region of the conductive housing and within a predetermined distance from the first coupling-element. The lamp has a gap (e.g., air gap) provided between the RF source coupling-element and the first coupling-element. The gap provided by the predetermined distance according to a specific embodiment. The lamp has an RF source comprising an output and optionally an input. The output of the RF source is coupled to the first coupling-element through the gap and the RF source coupling-element.

In an alternative specific embodiment, the present invention provides an alternative electrodeless plasma lamp. The lamp has a conductive housing having a spatial volume defined within the conductive housing. The spatial volume has an inner region and an outer region within the conductive housing. In a specific embodiment, the lamp has a support body having an outer surface region disposed within or partially within the inner region of the spatial volume of the conductive housing and a conductive material overlying the outer surface region of the support body. The lamp has a gas-filled vessel having a transparent or translucent body having an inner surface and an outer surface and a cavity formed within the inner surface. The gas filled vessel comprises a first end region and a second end region and a length defined between the first end region and the second end region. In a specific embodiment, the lamp has a first coupling-element (bulb/output coupling-element) coupled to the first end region of the gas-filled vessel. The first coupling-element is electrically coupled to the conductive housing. The lamp has an RF source coupling-element spatially disposed within the outer region of the conductive housing and within a predetermined distance from the first coupling-element. In a specific embodiment, the lamp has a gap provided between the RF source coupling-element and the first coupling-element. The gap is formed by the predetermined distance. In a specific embodiment, the lamp has an RF source comprising an output and optionally an input. The output of the RF source is coupled to the first coupling-element through the gap and the RF source coupling-element.

In yet an alternative specific embodiment, the present invention provides an electrodeless plasma lamp. The lamp has a conductive housing having a spatial volume defined within the conductive housing. The spatial volume having an inner region and an outer region. The lamp has a metal support body having an outer surface region disposed within or partially within the inner region of the spatial volume of the conductive housing. The lamp has a gas-filled vessel having a transparent or translucent body having an inner surface and an outer surface and a cavity formed within the inner surface. The gas-filled vessel comprises a first end region and a second end region and a length defined between the first end region and the second end region. The lamp has a first coupling-element coupled to the first end region of the gas-filled vessel. In a specific embodiment, the first coupling-element is electrically coupled to the conductive housing. The lamp also has a second coupling-element coupled to the second end region of the gas-filled vessel. An RF source coupling-element is spatially disposed within the outer region of the conductive housing and within a predetermined distance from the first coupling element. A gap is provided between the RF source coupling-element and the first coupling-element. The lamp has an RF source comprising an output, which is coupled to the first coupling-element through the gap and the RF source coupling-element.

Still further, the present invention provides a method of operating an electrodeless plasma lamp device. The method includes providing a plasma lamp, which can be any of the ones described herein. The method includes transferring RF energy from the RF source to the input coupling-element (RF source coupling-element), which is coupled to a gas filled vessel through a bulb/output coupling-element (first coupling-element) and an air gap. In a preferred embodiment, the RF energy has a frequency ranging from about 100 MHz to about 20 GHz, but can be others. The method includes illuminating electromagnetic energy substantially from the length of the gas-filled vessel from discharge of the gas-filled vessel. Optionally, the method includes transferring thermal energy from the gas-filled vessel through a conductive material of the first coupling element. In a preferred embodiment, the conductive material can be characterized as a thermal conductor and an electrical conductor.

Moreover, the present invention provides a method of operating an electrodeless plasma lamp device. The method includes providing a plasma lamp device, which can be any of the ones described herein. The method includes adjusting a predetermined distance between an RF source coupling-element and a first coupling-element coupled to a gas-filled vessel from a first distance to a second distance to change the first gap to a second gap, which is different from the first gap. In a preferred embodiment, the predetermined distance is an air gap or other non-solid region. Of course, there can be other variations, modifications, and alternatives.

Benefits are achieved over pre-existing techniques using the present invention. In a specific embodiment, the present invention provides a method and device having configurations of input, output, and feedback coupling-elements that provide for electromagnetic coupling to the bulb whose power transfer and frequency resonance characteristics that are largely independent of the conventional dielectric resonator. In a preferred embodiment, the present invention provides a method and configurations with an arrangement that provides for improved manufacturability as well as design flexibility. Other embodiments may include integrated assemblies of the output coupling element and bulb that function in a complementary manner with the present coupling element configurations and related methods. Still further, the present method and device provide for improved heat transfer characteristics, as well as further simplifying manufacturing. In a specific embodiment, the present method and resulting structure are relatively simple and cost effective to manufacture for commercial applications. Depending upon the embodiment, one or more of these benefits may be achieved. These and other benefits may be described throughout the present specification and more particularly below.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

A more complete understanding of the present invention and its advantages will be gained from a consideration of the following description of preferred embodiments, read in conjunction with the accompanying drawings provided herein. In the figures and description, numerals indicate various features of the invention, and like numerals referring to like features throughout both the drawings and the description.

DETAILED DESCRIPTION OF THE INVENTION

Figure 1A:
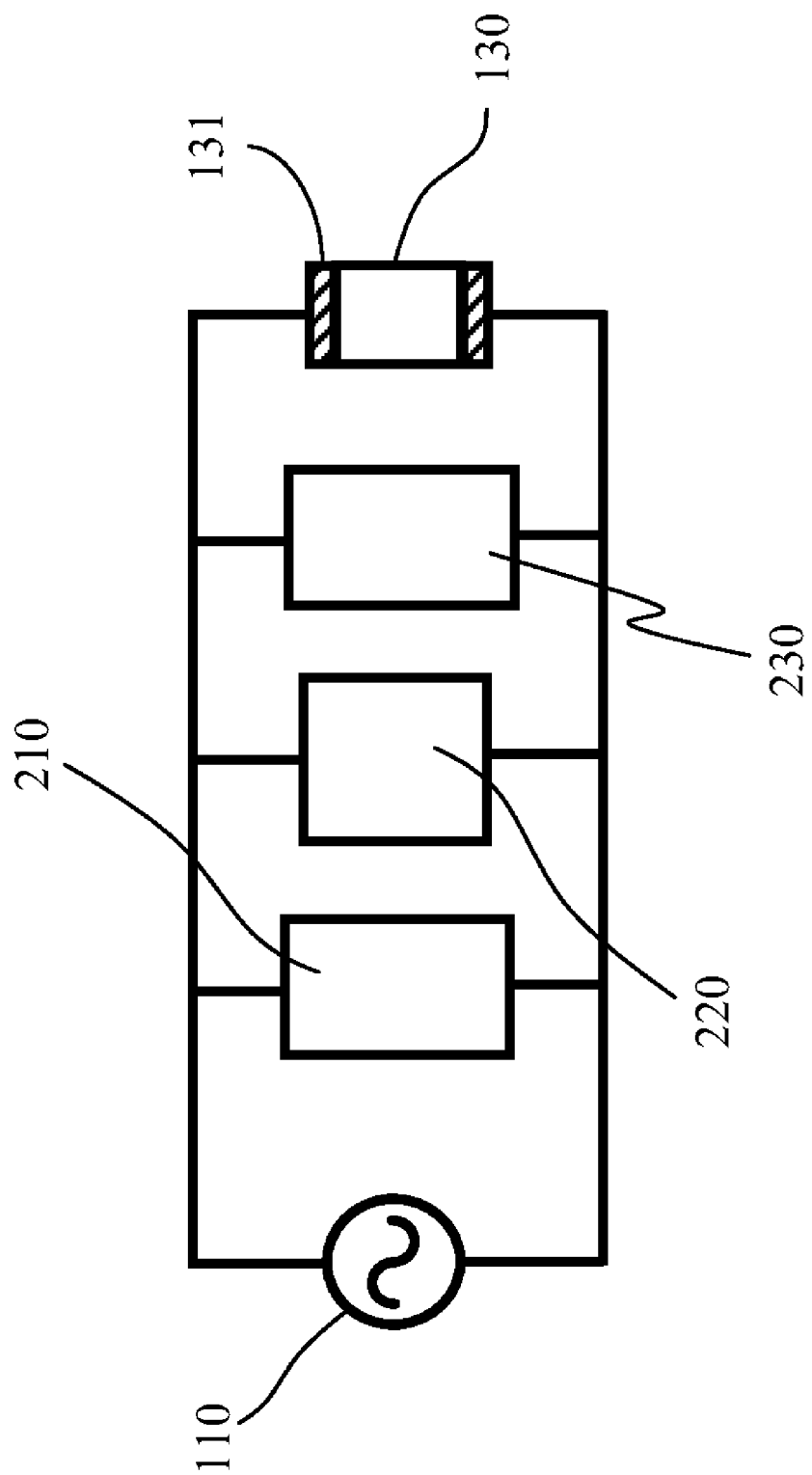
FIG. 1A is a generalized schematic of a gas-filled vessel being driven by an RF source, and capacitively coupled to the source; to optimize lamp efficiency and light output, a plurality of impedance matching networks are present between the RF source and the resonator and between the resonator and gas-filled vessel according to an embodiment of the present invention.

According to the present invention, techniques directed to devices and methods for generating light with plasma lamps are provided. More particularly, the present invention provides plasma lamps driven by a radio-frequency source without the use of electrodes inside a gas-filled vessel (bulb) and related methods. Merely by way of example, such plasma lamps can be applied to applications such as stadiums, security, parking lots, military and defense, streets, large and small buildings, bridges, warehouses, agriculture, uv water treatment, architectural lighting, stage lighting, medical illumination, microscopes, projectors and displays, any combination of these, and the like.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object. Additionally, the terms "first" and "second" or other like descriptors do not necessarily imply an order, but should be interpreted using ordinary meaning.

FIG. 1A illustrates a general schematic for efficient energy transfer from RF source 110 to gas-filled vessel 130. This diagram is merely an example, which should not unduly limit the scope of the claims herein. One of ordinary skill in the art would recognize other variations, modifications, and alternatives. Energy from the RF source is directed to an impedance matching network 210 that enables the effective transfer of energy from RF source to resonating structure 220. An example of such impedance matching network is an E-field or H-field coupling element, but can be others. Another impedance matching network 230, in turn, enables efficient energy transfer from resonator to gas-filled vessel 130 according to an embodiment of the present invention. An example of the impedance matching network is an E-field or H-field coupling element Of course, there can be other variations, modifications, and alternatives.

In a specific embodiment, the gas-filled vessel is made of a suitable material such as quartz or other transparent or translucent material. The gas-filled vessel is filled with an inert gas such as Argon and a fluorophor such as Mercury, Sodium, Dysprosium, Sulfur or a metal halide salt such as Indium Bromide, Scandium Bromide, or Cesium Iodide (or it can simultaneously contain multiple fluorophors). Mercury, Thallium Iodide, and Indium Bromide according to a specific embodiment. The gas-filled vessel can also includes a metal halide, or other metal pieces that will discharge electromagnetic radiation according to a specific embodiment. Of course, there can be other variations, modifications, and alternatives.

In a specific embodiment, a capacitive coupling structure 131 is used to deliver RF energy to the gas fill within the bulb 130. As is well known, a capacitive coupler typically comprises two electrodes of finite extent enclosing a volume and couples energy primarily using at least Electric fields (E-fields). As can be appreciated by one of ordinary skill in the art, the impedance matching networks 210 and 230 and the resonating structure 220, as depicted in schematic form here, can be interpreted as equivalent-circuit models of the distributed electromagnetic coupling between the RF source and the capacitive coupling structure. The use of impedance matching networks also allows the source to have an impedance other than 50 ohm; this may provide an advantage with respect to RF source performance in the form of reduced heating or power consumption from the RF source. Lowering power consumption and losses from the RF source would enable a greater efficiency for the lamp as a whole. As can also be appreciated by one of ordinary skill in the art, the impedance matching networks 210 and 230 are not necessarily identical.

Figure 1B:
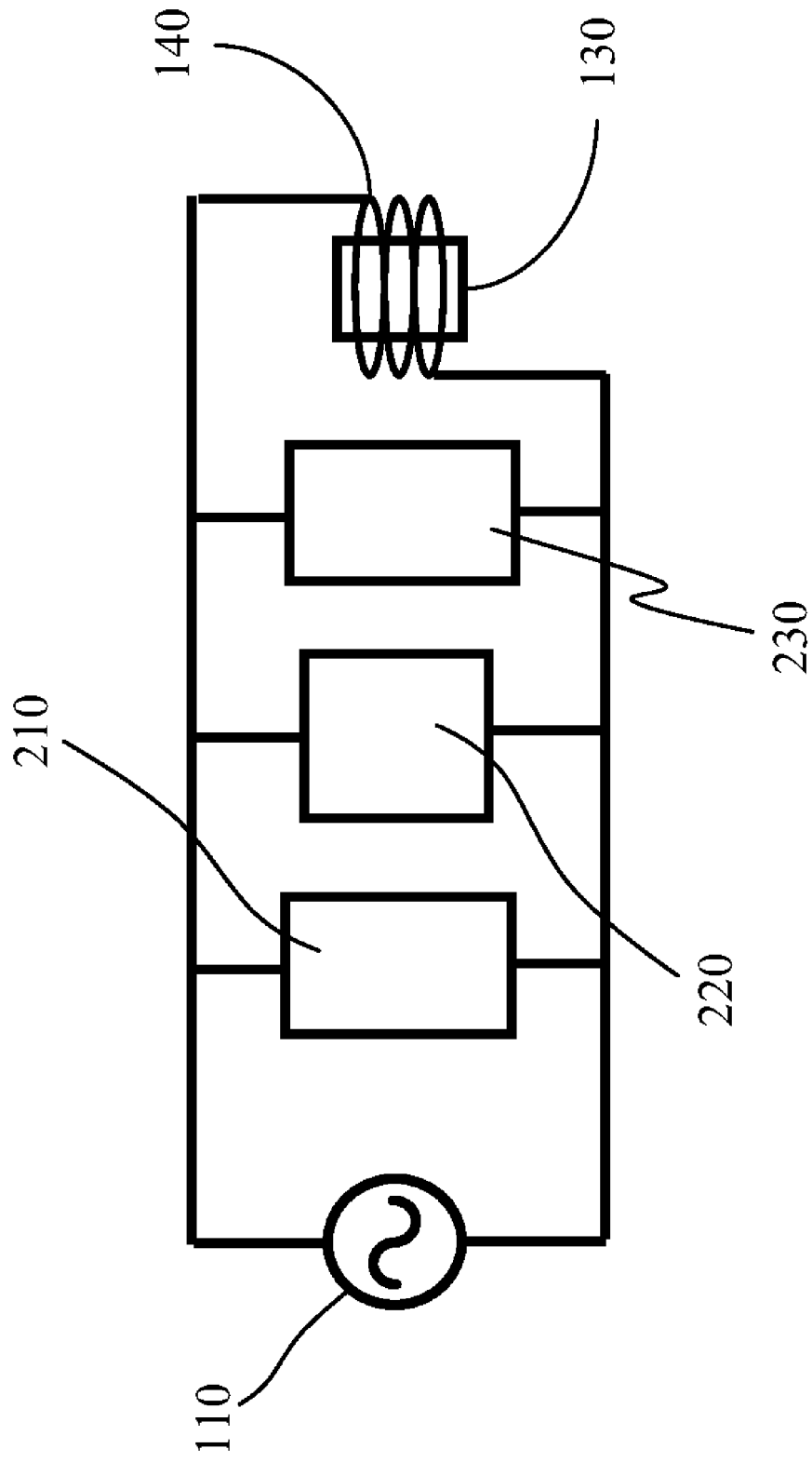
FIG. 1B is a generalized schematic of a gas-filled vessel being driven by an RF source, and inductively coupled to the source; to optimize lamp efficiency and light output, a plurality of impedance matching networks are present between the RF source and the resonator and between the resonator and gas-filled vessel according to an embodiment of the present invention.

FIG. 1B illustrates a general schematic for efficient energy transfer from RF source 110 to gas-filled vessel 130. This diagram is merely an example, which should not unduly limit the scope of the claims herein. One of ordinary skill in the art would recognize other variations, modifications, and alternatives. Energy from the RF source is directed to an impedance matching network 210 that enables the effective transfer of energy from RF source to resonating structure 220. Another impedance matching network 230, in turn, enables efficient energy transfer from resonator to gas-filled vessel 130. An inductive coupling structure 140 is used to deliver RF energy to the gas fill within the bulb 130. As is well known, an inductive coupler typically comprises a wire or a coil-like wire of finite extent and couples energy primarily using magnetic fields (H-fields). As can be appreciated by one of ordinary skill in the art, the impedance matching networks 210 and 230 and the resonating structure 220, as depicted in schematic form here, can be interpreted as equivalent-circuit models of the distributed electromagnetic coupling between the RF source and the inductive coupling structure. The use of impedance matching networks also allows the source to have an impedance other than 50 ohm; this may provide an advantage with respect to RF source performance in the form of reduced heating or power consumption from the RF source. Lowering power consumption and losses from the RF source would enable a greater efficiency for the lamp as a whole. As can also be appreciated by one of ordinary skill in the art, the impedance matching networks 210 and 230 are not necessarily identical.

Figure 2A:
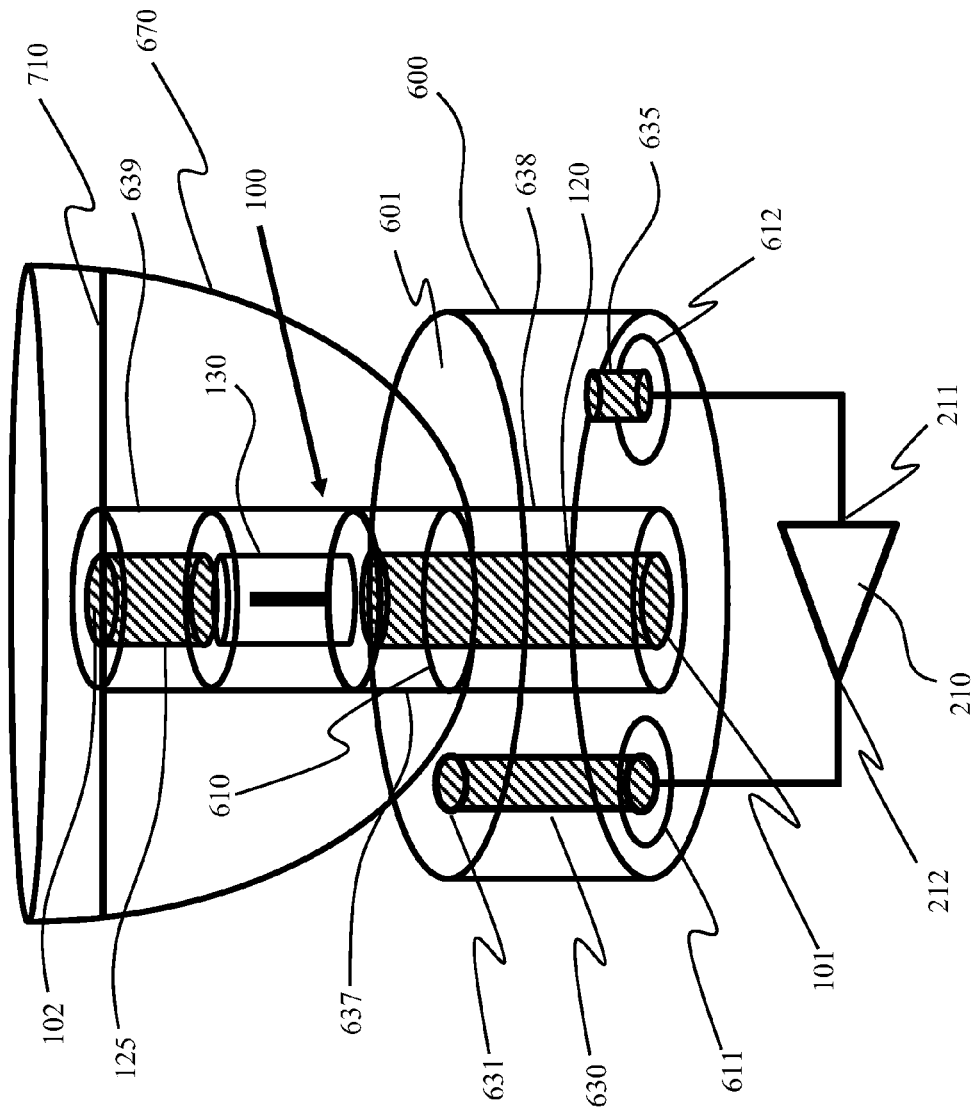
FIG. 2A is a simplified perspective view of an external resonator electrodeless lamp, comprising a lamp body, input and feedback coupling elements, an integrated bulb/output coupling element assembly, an external reflector, and an external RF amplifier according to an embodiment of the present invention. The external RF amplifier is connected in a positive feedback configuration that sustains oscillation, which couples energy to the bulb. The resonant characteristics of the coupling between the input and output coupling elements provide for frequency-selective oscillation in the feedback loop.

FIG. 2A is a perspective view of an electrodeless lamp, employing a lamp body 600, whose outer surface 601 is electrically conductive and is connected to ground. This diagram is merely an example, which should not unduly limit the scope of the claims herein. One of ordinary skill in the art would recognize other variations, modifications, and alternatives. A cylindrical lamp body is depicted, but rectangular or other shapes may be used. This conductivity may be achieved through the application of a conductive veneer, or through the choice of a conductive material. An example embodiment of conductive veneer is silver paint or alternatively the lamp body can be made from sheet of electrically conductive material such as aluminum. An integrated bulb/output coupling-element assembly 100 is closely received by the lamp body 600 through opening 610. The bulb/output coupling-element assembly 100 contains the bulb 130, which is a gas-filled vessel that ultimately produces the luminous output.

One aspect of the invention is that the bottom of the assembly 100, output coupling-element 120, is grounded to the body 600 and its conductive surface 601 at plane 101. The luminous output from the bulb is collected and directed by an external reflector 670, which is either electrically conductive or if it is made from a dielectric material has an electrically conductive backing, and which is attached to and in electrical contact with the body 600. Another aspect of the invention is that the top of the assembly 100, top coupling-element 125, is grounded to the body 600 at plane 102 via the ground strap 710 and the reflector 670. Alternatively, the reflector 670 may not exist, and the ground strap makes direct electrical contact with the body 600. Reflector 670 is depicted as parabolic in shape with bulb 130 positioned near its focus. Those of ordinary skill in the art will recognize that a wide variety of possible reflector shapes can be designed to satisfy beam-direction requirements. In a specific embodiment, the shapes can be conical, convex, concave, trapezoidal, pyramidal, or any combination of these, and the like. The shorter feedback E-field coupling-element 635 couples a small amount of RF energy from the bulb/output coupling-element assembly 100 and provides feedback to the RF amplifier input 211 of RF amplifier 210. Feedback coupling-element 635 is closely received by the lamp body 600 through opening 612, and as such is not in direct DC electrical contact with the conductive surface 601 of the lamp body. The input coupling-element 630 is conductively connected with RF amplifier output 212. Input coupling-element 630 is closely received by the lamp body 600 through opening 611, and as such is not in direct DC electrical contact with the conductive surface 601 of the lamp body. However, it is another key aspect of the invention that the top of the input coupling-element is grounded to the body 600 and its conductive surface 601 at plane 631.

RF power is primarily inductively coupled strongly from the input coupling-element 630 to the bulb/output coupling-element assembly 100 through physical proximity, their relative lengths, and the relative arrangement of their ground planes. Surface 637 of bulb/output coupling-element assembly is covered with an electrically conductive veneer or an electrically conductive material and is connected to the body 600 and its conductive surface 601. The other surfaces of the bulb/output coupling-element assembly including surfaces 638, 639, and 640 are not covered with a conductive layer. In addition surface 640 is optically transparent or translucent. The coupling between input coupling-element 630 and output coupling-element 120 and lamp assembly 100 is found through electromagnetic simulation, and through direct measurement, to be highly frequency selective and to be primarily inductive. This frequency selectivity provides for a resonant oscillator in the circuit comprising the input coupling-element 630, the bulb/output coupling-element assembly 100, the feedback coupling-element 635, and the amplifier 210.

One of ordinary skill in the art will recognize that the resonant oscillator is the equivalent of the RF source 110 depicted schematically in FIG. 1A and FIG. 1B. A significant advantage of the invention is that the resonant frequency is strongly dependent on the relative lengths of the input and output coupling-elements. This permits the use of a compact lamp body whose natural resonant frequency may be much higher than the actual frequency of operation. In one example embodiment, the bottom of the lamp body 600 may consist of a hollow aluminum cylinder with a 1.5" diameter, and a height of 0.75". The fundamental resonant frequency of such an air cavity resonator is approximately 4 GHz but by using the design described above for the input coupling-element and the output coupling-element and by adjusting the length of the output coupling-element the overall resonant frequency of the lamp assembly can be reduced to 900 MHz or no greater than about 900 MHz in a specific embodiment. Another significant advantage of the invention is that the RF power coupled to the bulb 130 is strongly dependent on the physical separation between the input coupling-element 630 and the output coupling-element 120 within the bulb/output coupling-element assembly 100. This permits fine tuning, at assembly time, of the brightness output of a lamp which is comprised of components with relaxed dimensional tolerances. Another significant advantage of the invention is that the input coupling-element 630 and the bulb/output coupling-element assembly 100 are respectively grounded at planes 631 and 101, which are coincident with the outer surface of the body 600. This eliminates the need to fine-tune their depth of insertion into the lamp body—as well as any sensitivity of the RF coupling between them to that depth—simplifying lamp manufacture, as well as improving consistency in lamp brightness yield.

Figure 2B:
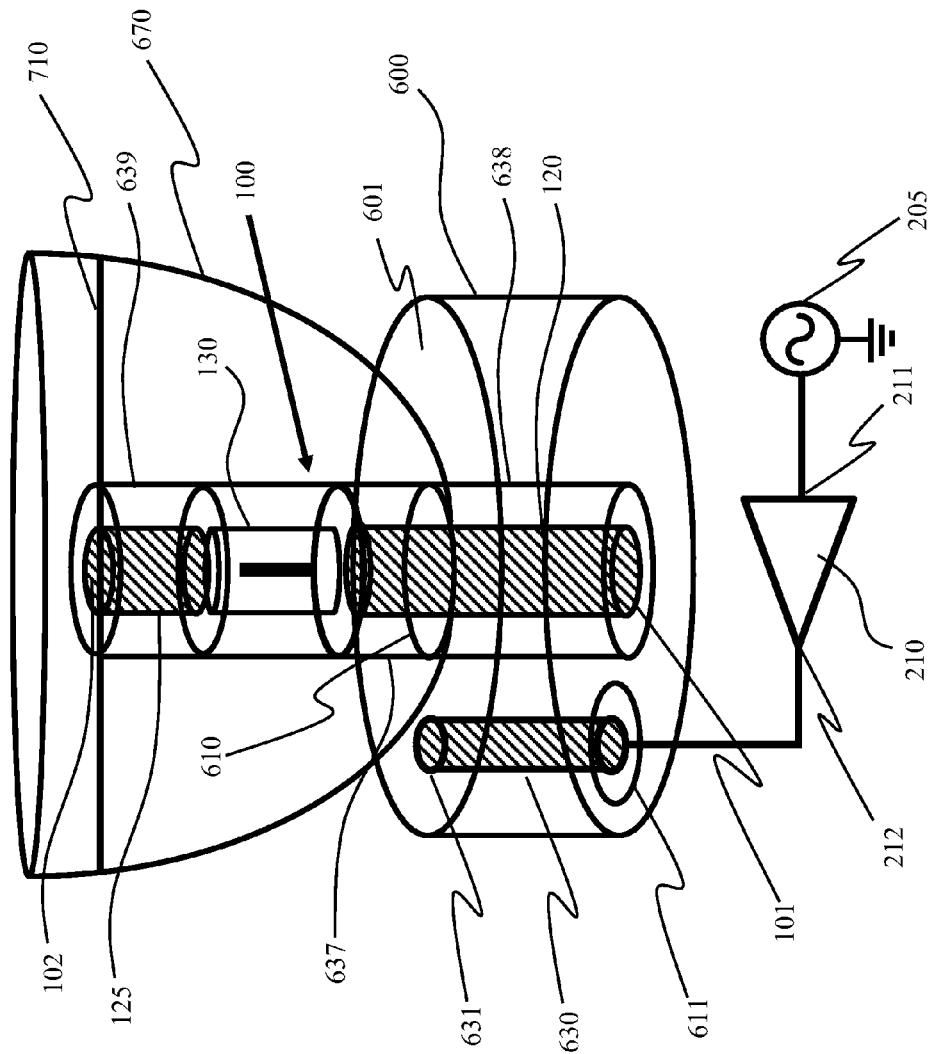
FIG. 2B is a simplified perspective view of an alternate external resonator electrodeless lamp, comprising a lamp body, input coupling element, an integrated bulb/output coupling element assembly, an external reflector, and an external RF source that may comprise an oscillator and an amplifier according to an embodiment of the present invention.

FIG. 2B is a perspective view of an electrodeless lamp that differs from that shown in FIG. 2A only in its RF source, which is not a distributed oscillator circuit, but rather a separate oscillator 205 conductively connected with RF amplifier input 211 of the RF amplifier 210. RF amplifier output 212 is conductively connected with input coupling-element 630, which delivers RF power to the lamp/output coupling-element assembly 100. The resonant characteristics of the coupling between the input coupling-element 630 and the output coupling-element in the bulb/output coupling-element assembly 100 are frequency-matched to the RF source to optimize RF power transfer. Of course, there can be other variations, modifications, and alternatives.

Figure 2C:
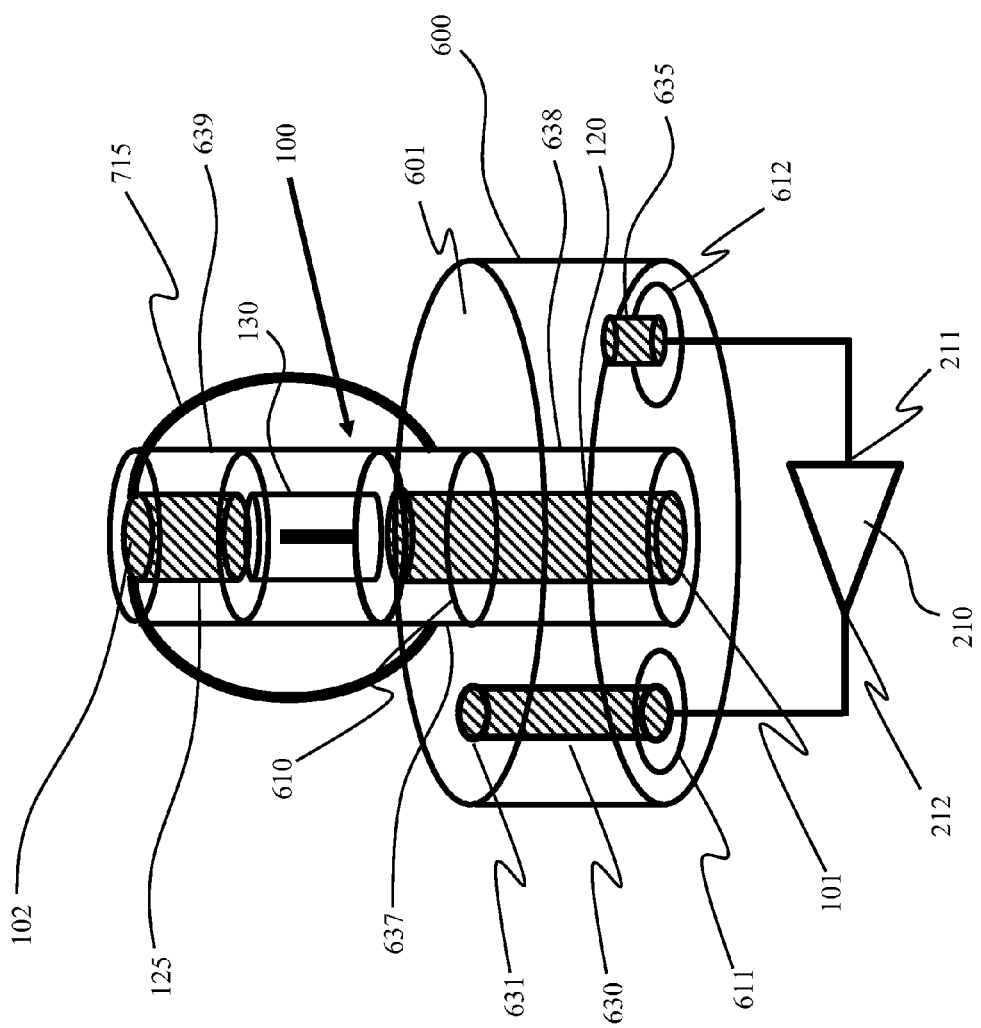
FIG. 2C is a simplified perspective view of an alternate external resonator electrodeless lamp, comprising a lamp body, input and feedback coupling elements, an integrated bulb/output coupling element assembly, and an external RF amplifier according to an embodiment of the present invention. The external RF amplifier is connected in a positive feedback configuration that sustains oscillation, which couples energy to the bulb. The resonant characteristics of the coupling between the input and output coupling elements provide for frequency-selective oscillation in the feedback loop.

FIG. 2C is a perspective view of an electrodeless lamp that is similar to the electrodeless lamp shown in FIG. 2A except that it does not have a reflector 670. The top coupling-element 125 in the bulb assembly is directly connected to the lamp body 600 using ground straps 715. This diagram is merely an example, which should not unduly limit the scope of the claims herein. One of ordinary skill in the art would recognize other variations, modifications, and alternatives.

Figure 2D:
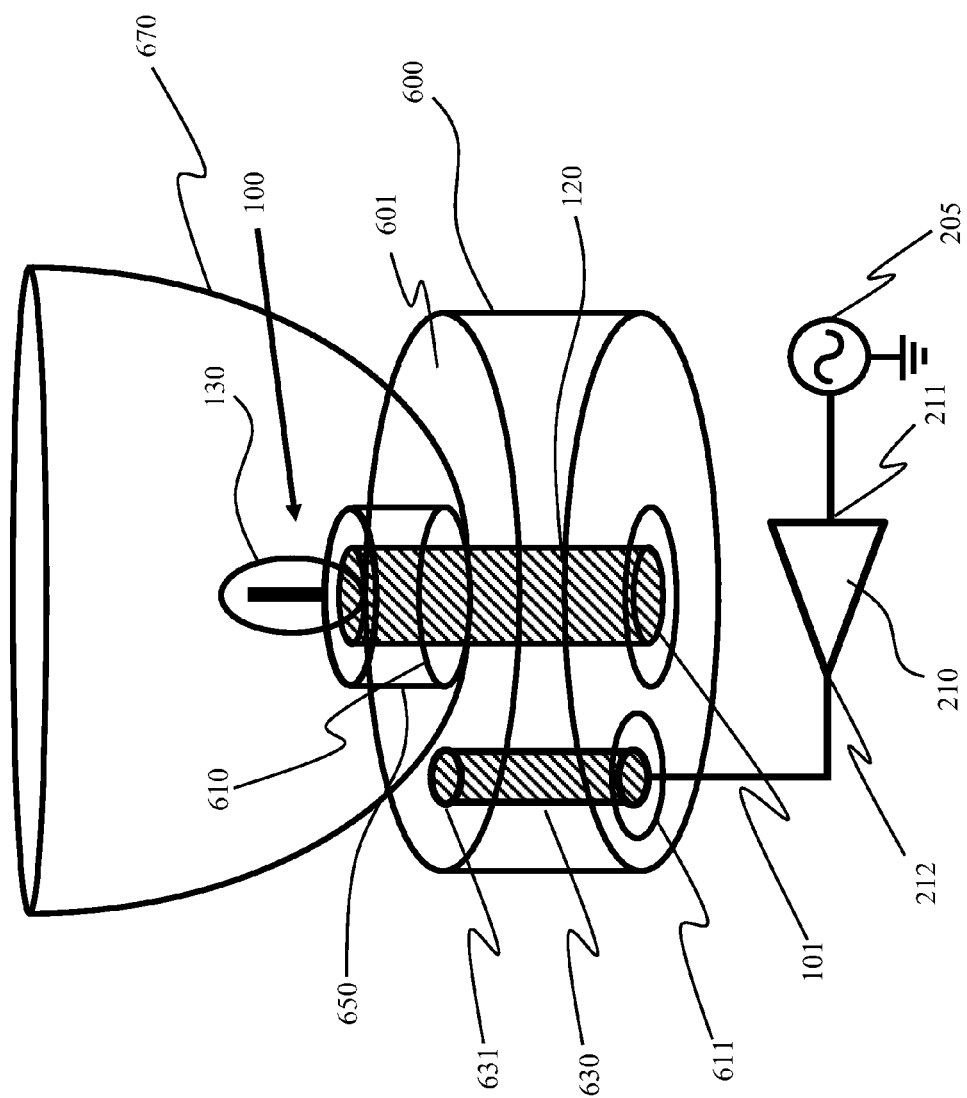
FIG. 2D is a simplified perspective view of an alternate external resonator electrodeless lamp, comprising a lamp body, input coupling element, an integrated bulb/output coupling element assembly, an external reflector, and an external RF source that may comprise an oscillator and an amplifier according to an embodiment of the present invention.

FIG. 2D is a perspective view of an electrodeless lamp that differs from that shown in FIG. 2B in its lamp/output coupling element assembly 100. The lamp/output coupling element assembly consists of a solid metal (metal post) 120 recessed at the top to receive the gas-filled vessel 130. The other end of the coupling-element is grounded to lamp body at surface 101. The top portion of the metal post is surrounded by metal ring 650 shown in FIG. 4. A thin layer of dielectric material or refractory metal such as molybdenum can be used as interface between the bulb and the metal post. Alternatively the top part of the metal post or all of the metal post can be made from a refractory metal with its outer surface covered with a layer of metal with high electrical conductivity such as silver or copper. The metal post can also be hollow inside.

Figure 3B:
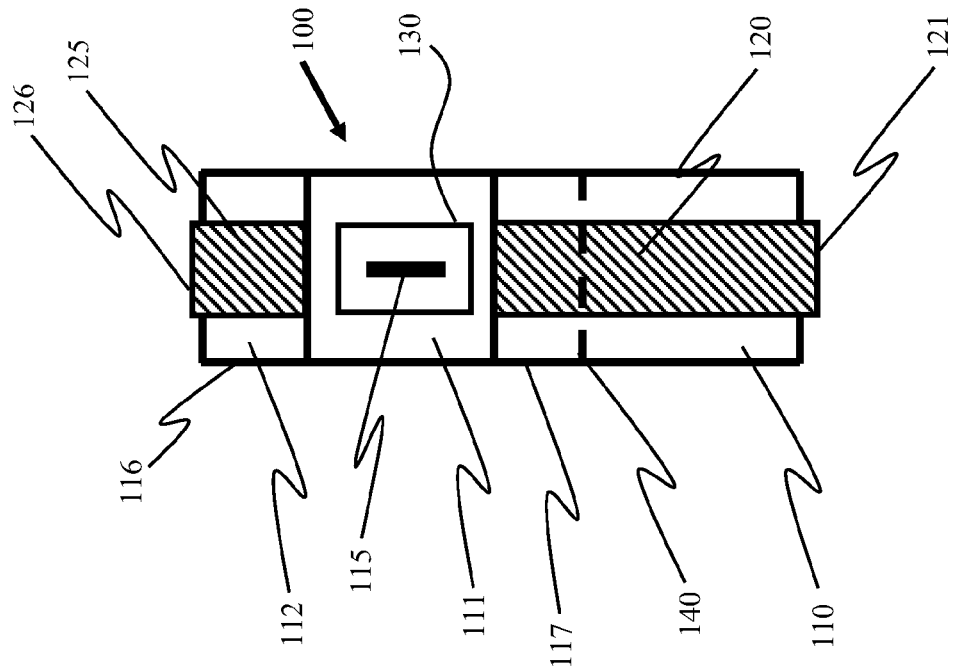
FIG. 3B is a simplified side-cut view of the integrated bulb/output coupling-element assembly shown in FIG. 3A comprising multiple sections including an output coupling-element, a gas-filled vessel that is the bulb, and a top coupling-element according to an embodiment of the present invention. The output coupling-element and top coupling-element are solid electrical conductors.
Figure 3A:
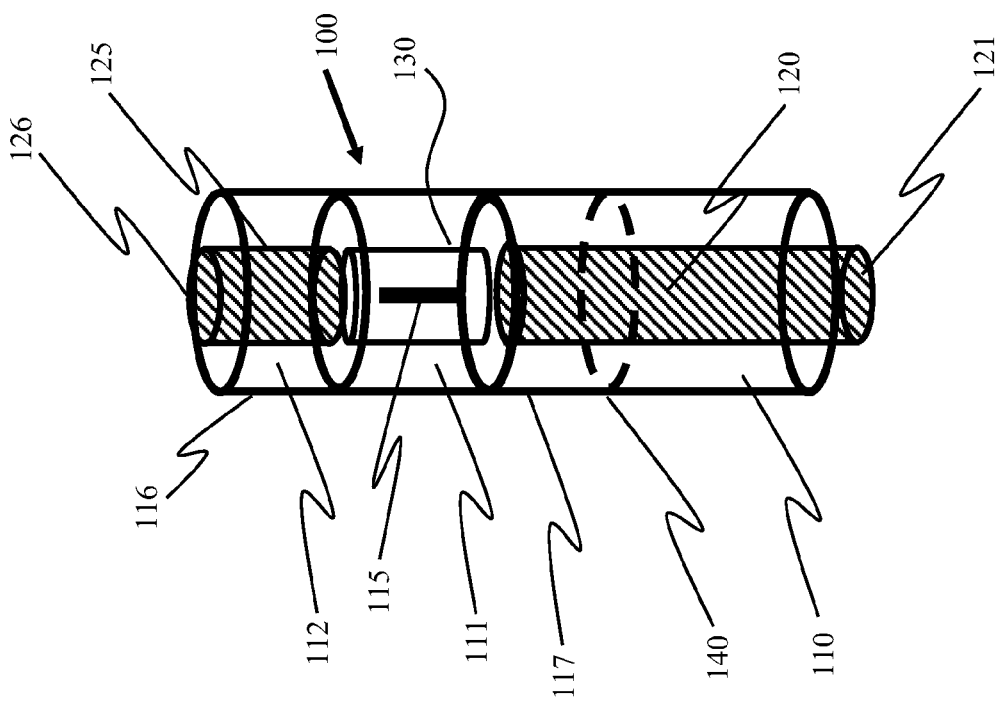
FIG. 3A is a simplified perspective view of an integrated bulb/output coupling element assembly comprising multiple sections including an output coupling element, a gas-filled vessel that is the bulb, and top coupling-element according to an embodiment of the present invention. The output coupling-element and top coupling-element are solid electrical conductors.

FIG. 3A is a perspective view of an integrated bulb/output coupling-element assembly 100 which is the same as assembly 100 depicted in FIGS. 2A, 2B, and 2C. This diagram is merely an example, which should not unduly limit the scope of the claims herein. One of ordinary skill in the art would recognize other variations, modifications, and alternatives. The assembly comprises a lower section 110, a mid-section 111, and upper section 112. Alternatively, these sections may not be physically separate. The lower section 110 is bored to closely receive output coupling-element 120, which is a solid conductor. Coupling-element 120 protrudes from the lower section 110 at plane 121. It is a key aspect of this invention that coupling-element 120 makes ground contact at plane 121 with the lamp body 600 depicted in FIGS. 2A, 2B, and 2C. The mid-section 111 is hollowed to closely receive the bulb 130, which is the gas-filled vessel that ultimately produces the lamp's luminous output. The gas-filled vessel contains an inert gas such as Argon and a fluorophor such as Mercury, Sodium, Sulfur or a metal halide salt such as Indium Bromide or Cesium Iodide (or it can simultaneously contain multiple fluorophors). Alternatively, the mid-section 111 is hollowed, with the resulting cavity forming the volume of the bulb 130, making the two an integrated unit. The mid-section 111 can be attached to the lower section 110 and upper section 112 using high temperature adhesive. The upper section 112 is bored to closely receive top electrode 125, which is a solid conductor. Top electrode 125 protrudes from upper section 112 at plane 126. It is a key aspect of this invention that the top coupling-element 125 makes ground contact at plane 126 with the lamp body 600, as depicted in FIGS. 2A, 2B, and 2C. This is through the ground strap 710 and the reflector body 670 or ground strap 715. Overall, RF energy is coupled capacitively, or inductively, or a combination of inductively and capacitively, by the output coupling-element 120 and top coupling-element 125 to the bulb 130 which is made from quartz, translucent alumina, or other similar material, ionizing the inert gas and vaporizing the fluorophor resulting in intense light 115 emitted from the lamp.

Figure 4:
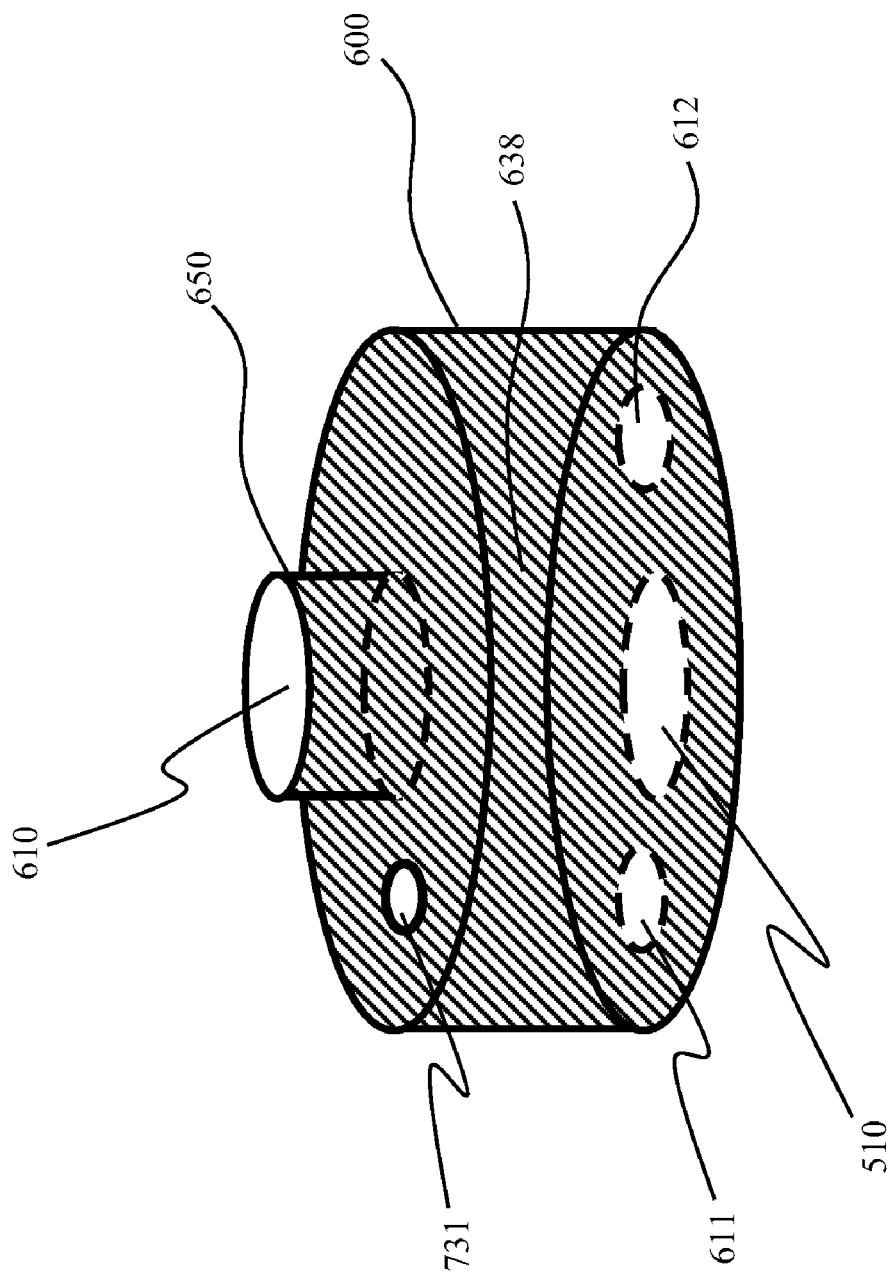
FIG. 4 is a simplified perspective view of the lamp body/metallic enclosure of the lamp shown in FIGS. 2A, 2B, 2C, and 2D according to an embodiment of the present invention. The hollow conductive lamp body receives the integrated bulb/output coupling-element assembly as well as the input coupling-element and the feedback coupling-element.

Sections 110, 111, and 112 can all be made from the same material or from different materials. Section 111 has to be transparent to visible light and have a high melting point such as quartz or translucent alumina. Sections 110 and 112 can be made from transparent (quartz or translucent alumina) or opaque materials (alumina) but they have to have low loss at RF frequencies. In the case that the same material is used for all three sections the assembly can be made from a single piece of material such as a hollow tube of quartz or translucent alumina. The upper section 112 may be coated with a conductive veneer 116 whose purpose is to shield electromagnetic radiation from the top-electrode 125. The lower section 110 may be partially coated with a conductive veneer 117 whose purpose is to shield electromagnetic radiation from the output coupling-element 120. The partial coating would extend to the portion of the lower section 110 that protrudes from the lamp body 600, as depicted in FIGS. 2A, 2B, and 2C and does not overlap with input coupling-element 630. The plane dividing that portion that protrudes from the lamp body from that portion that does not being depicted schematically by dashed line 140. An example embodiment of conductive veneers 116 and 117 is silver paint. Alternatively, instead of conductive veneers portion of the lower section 110 can be covered by a metal ring 650 as part of the extension of lamp body 600 as depicted in FIG. 4. The outer surface of the mid section 111 is not coated.

FIG. 3B is a side-cut view of an integrated bulb/output coupling-element assembly 100 shown in FIG. 3A. This diagram is merely an example, which should not unduly limit the scope of the claims herein. One of ordinary skill in the art would recognize other variations, modifications, and alternatives. The assembly can be made from a single piece of material such as a hollow quartz tube or translucent alumina, or it can be made from three different pieces and assembled together.

Figure 3D:
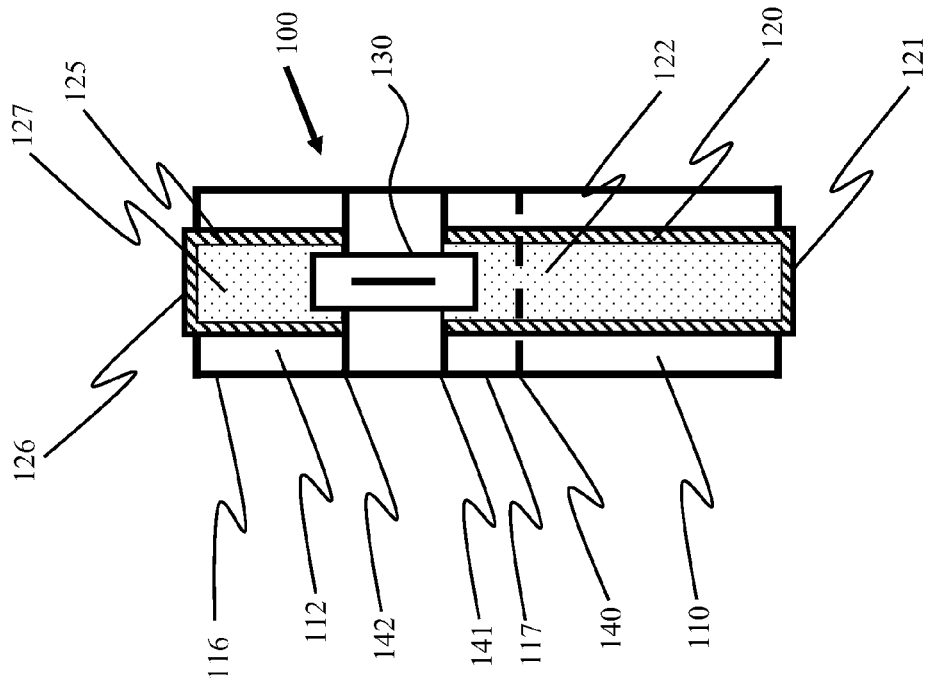
FIG. 3D is a simplified side-cut view of the alternate integrated bulb/output coupling-element assembly shown in FIG. 3C comprising multiple sections including an output coupling-element, a gas-filled vessel that is the bulb, and a top coupling-element according to an embodiment of the present invention. The output coupling-element and top coupling-element are of conductively-coated dielectric material.
Figure 3C:
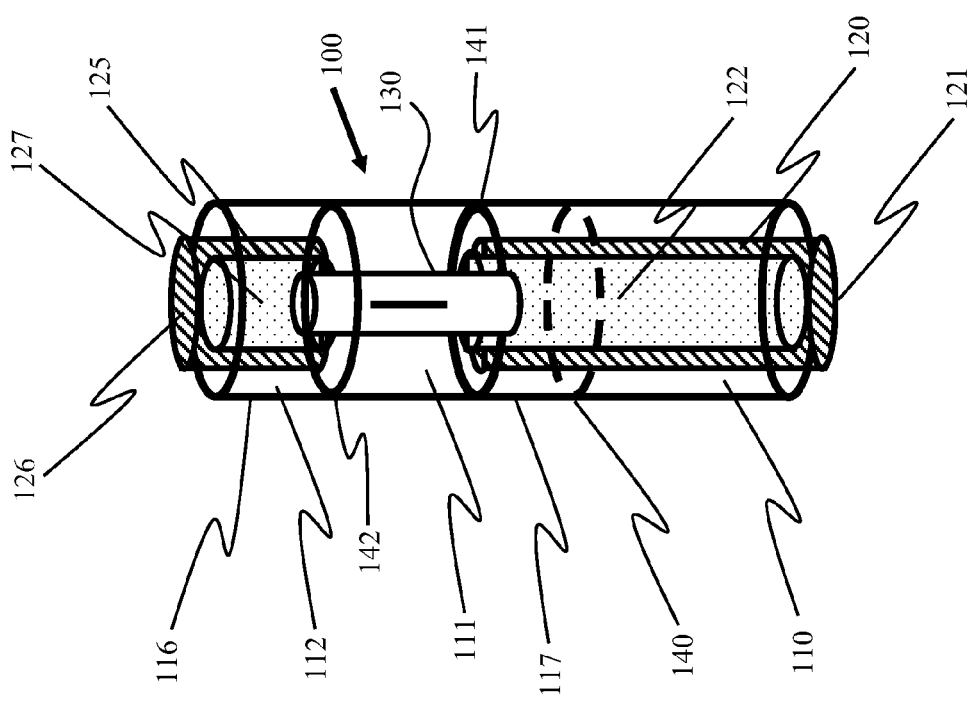
FIG. 3C is a simplified perspective view of an alternate integrated bulb/output coupling-element assembly comprising multiple sections including an output coupling-element, a gas-filled vessel that is the bulb, and a top coupling-element according to an embodiment of the present invention. The output coupling-element and top coupling-element are of conductively-coated dielectric material.

FIG. 3C is a perspective view of an alternative design for an integrated bulb/output coupling-element assembly 100. This diagram is merely an example, which should not unduly limit the scope of the claims herein. One of ordinary skill in the art would recognize other variations, modifications, and alternatives. The assembly is similar to FIG. 3A except that the output coupling-element 120 and top coupling-element 125 are made using a conductive coated dielectric instead of a solid conductor. The bulb assembly comprises three sections 110, 111, and 112 which can be made separately from different materials and integrated together or can be made from a single piece such as a hollow tube of quartz or translucent alumina. The output coupling-element 120 consists of a dielectric post 122 made from a material such as alumina with its outer surface coated with a conductive veneer such as silver. The body 110 is bored to receive the output coupling-element 120. The top coupling-element 125 also consists of a dielectric post 127 made from a material such as alumina with its outer surface coated with a conductive veneer such as silver. It is a key invention that dielectric posts of the output coupling-element 120 and top coupling-element 125 are bored to closely receive bulb 130, such that heat transfer through their dielectric centers and RF coupling through their conductive outer coatings take place simultaneously. The areas of the dielectric posts of output coupling-element and top coupling-element that come in contact with the bulb are not covered with a conductive veneer. Using this bulb assembly approach the high RF fields are kept away from the ends of bulbs resulting in a more reliable lamp. It is also a key aspect of this invention that output coupling-element 120 and top coupling-element 125 make ground contact at planes 121 and 126 respectively with the lamp body 600 depicted in FIGS. 2A, 2B, and 2C.

The portion of body 110 that is received by the lamp body 600 as depicted in FIGS. 2A, 2B, and 2C (and overlaps with the length of input coupling-element 630) and is shown in FIG. 3C as being below the dashed line 140; is not coated with a conductive layer. The portion of body 110 that is above the lamp body 600 but substantially below the bulb 130 is depicted schematically as the area between 140 and 141; this portion may be coated with a conductive veneer. The portion of body 110 that is substantially above the bulb 130 is depicted as that area above line 142; this portion may also be coated with a conductive veneer 116. The purpose of the conductive coatings is to shield against unwanted electromagnetic radiation. An example embodiment of conductive veneers 116 and 117 is silver paint. Alternatively, instead of conductive veneers portion of the lower section 110 can be covered by a metal ring 650 as part of the extension of lamp body 600 as depicted in FIG. 4. The outer surface of the mid section 111 is not coated.

FIG. 3D is a side-cut view of an integrated bulb/output coupling-element assembly 100 shown in FIG. 3C. This diagram is merely an example, which should not unduly limit the scope of the claims herein. One of ordinary skill in the art would recognize other variations, modifications, and alternatives. The assembly can be made from a single piece of material such as a hollow quartz tube or translucent alumina, or it can be made from three different pieces and assembled together.

Figure 3F:
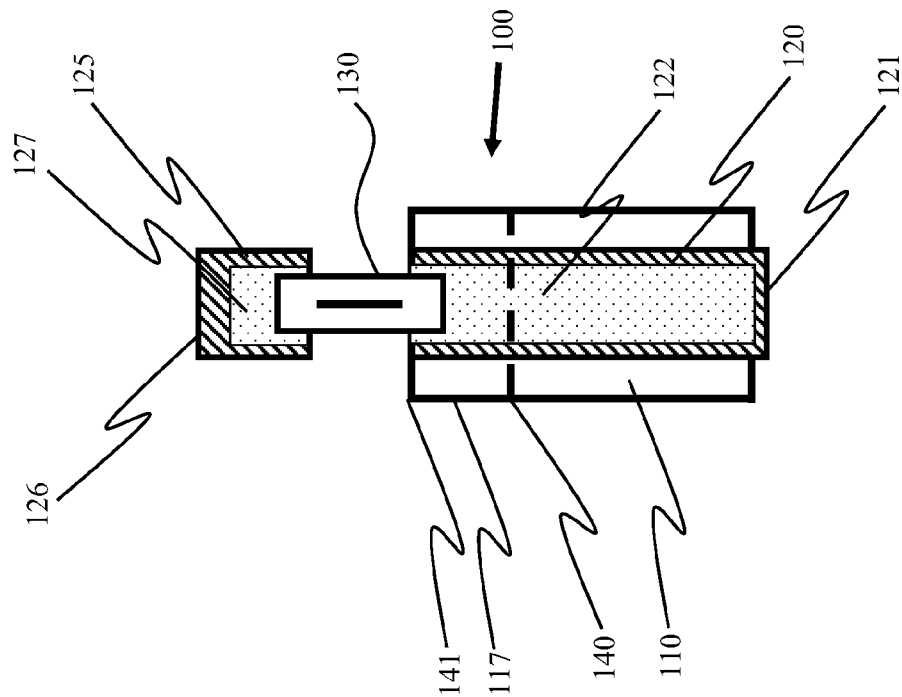
FIG. 3F is a simplified side-cut view of the alternate integrated bulb/output coupling-element assembly shown in FIG. 3E comprising multiple sections including an output coupling-element, a gas-filled vessel that is the bulb, and a top coupling-element according to an embodiment of the present invention. The output coupling-element and top coupling-element are of conductively-coated dielectric material.
Figure 3E:
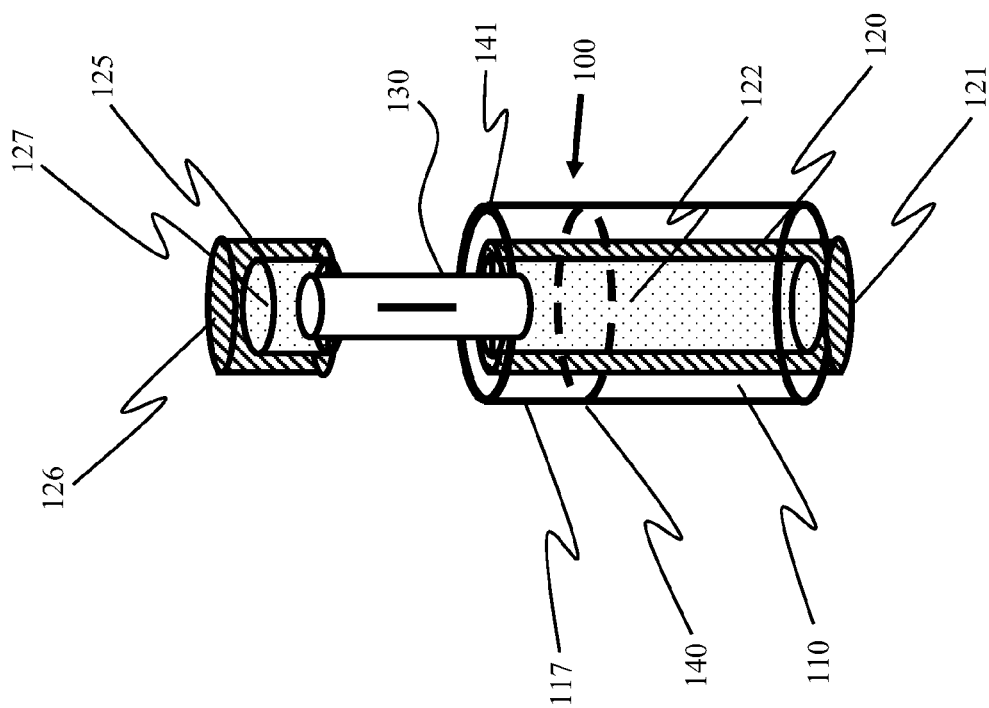
FIG. 3E is a simplified perspective view of an alternate integrated bulb/output coupling-element assembly comprising multiple sections including an output coupling-element, a gas-filled vessel that is the bulb, and a top coupling-element according to an embodiment of the present invention. The output coupling-element and top coupling-element are of conductively-coated dielectric material.

FIG. 3E is a perspective view of an alternative design for an integrated bulb/output-coupling-element assembly 100. This diagram is merely an example, which should not unduly limit the scope of the claims herein. One of ordinary skill in the art would recognize other variations, modifications, and alternatives. The assembly is similar to FIG. 3C except that the middle section and top section of the assembly are not inside a dielectric tube such as a quartz tube. The assembly consists of three sections. The bottom section 110 is identical to FIG. 3C and it contains the output coupling-element 120 which consists of a dielectric post 122 made from a material such as alumina with its outer surface coated with a conductive veneer such as silver. The middle section consists of the bulb (gas-filled vessel) 130 which is made from a material that is transparent to visible light such as quartz or translucent alumina. The top section consists of the top coupling-element 125 which also consists of a dielectric post 127 made from a material such as alumina with its outer surface coated with a conductive veneer such as silver. It is a key invention that dielectric posts of the output coupling-element 120 and top coupling-element 125 are bored to closely receive bulb 130, such that heat transfer through their dielectric centers and RF coupling through their conductive outer coatings take place simultaneously. The areas of the dielectric posts of output coupling-element and top coupling-element that come in contact with the bulb are not covered with a conductive veneer. Using this bulb assembly approach the high RF fields are kept away from the ends of bulbs resulting in a more reliable lamp. It is also a key aspect of this invention that output coupling-element 120 and top coupling-element 125 make ground contact at planes 121 and 126 respectively with the lamp body 600 depicted in FIGS. 2A, 2B, and 2C.

The portion of body 110 that is received by the lamp body 600 as depicted in FIGS. 2A, 2B, and 2C (and overlaps with the length of input coupling-element 630) and is shown in FIG. 3E as being below the dashed line 140; is not coated with a conductive layer. The portion of body 110 that is above the lamp body 600 but substantially below the bulb 130 is depicted schematically as the area between 140 and 141; this portion may be coated with a conductive veneer 117. The purpose of the conductive coatings is to shield against unwanted electromagnetic radiation. An example embodiment of conductive veneers 117 is silver paint. Alternatively, instead of conductive veneers portion of the lower section 110 can be covered by a metal ring 650 as part of the extension of lamp body 600 as depicted in FIG. 4.

FIG. 3F is a side-cut view of an integrated bulb/output-element assembly 100 shown in FIG. 3D. This diagram is merely an example, which should not unduly limit the scope of the claims herein. One of ordinary skill in the art would recognize other variations, modifications, and alternatives. It is similar to the assembly shown in FIG. 3E except that the middle and top sections of the assembly are not within a dielectric tube made from a material such as quartz.

Figure 3H:
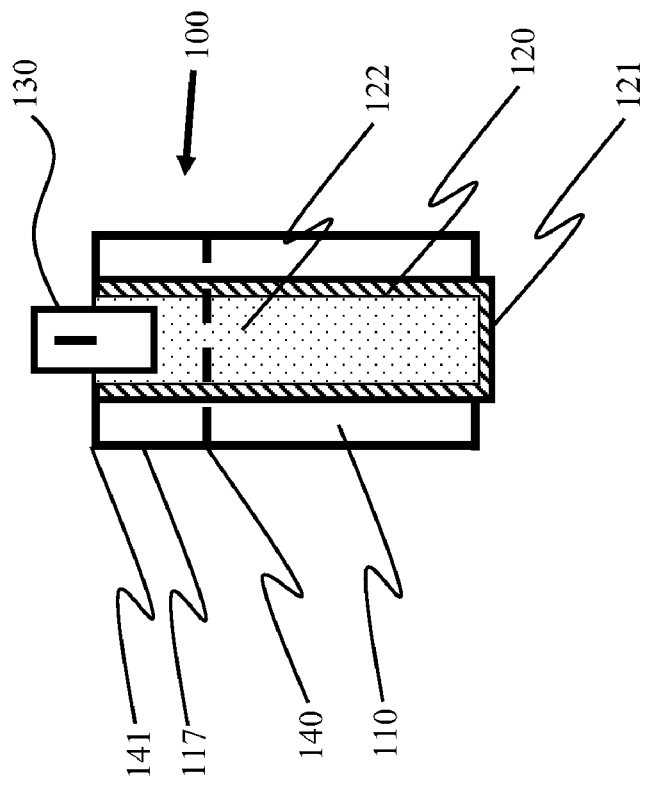
FIG. 3H is a side-cut view of the alternate integrated bulb/output coupling-element assembly shown in FIG. 3G comprising multiple sections including an output coupling-element, a gas-filled vessel that is the bulb, but without a top coupling-element. The output-coupling-element is made out of conductively-coated dielectric material.
Figure 3G:
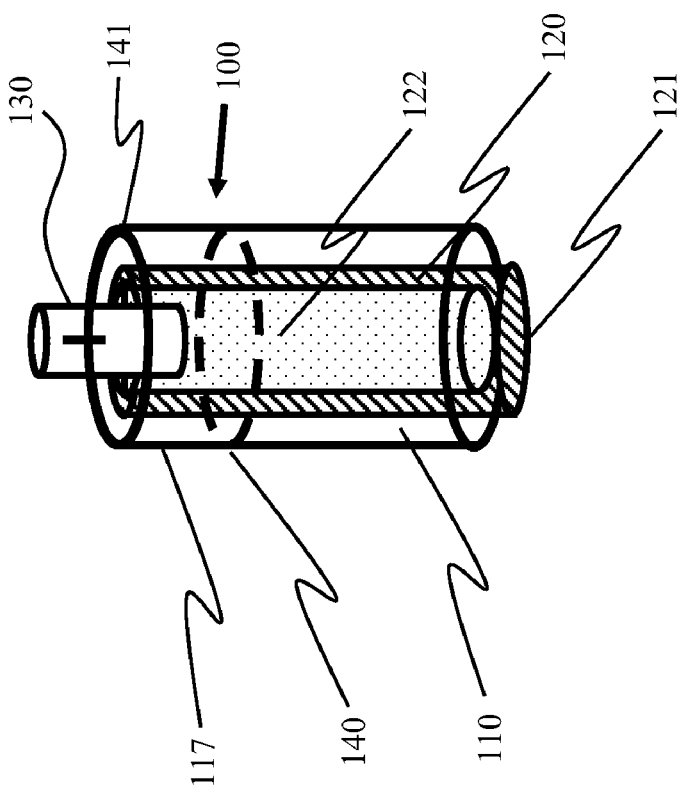
FIG. 3G is a perspective view of an alternate integrated bulb/output coupling-element assembly to the one in FIG. 3E comprising multiple sections including an output coupling-element, a gas-filled vessel that is the bulb, but without a top coupling-element. The output coupling-element is made out of conductively-coated dielectric material.

FIG. 3G is a perspective view of an alternative design for an integrated bulb/output coupling-element assembly 100. This diagram is merely an example, which should not unduly limit the scope of the claims herein. One of ordinary skill in the art would recognize other variations, modifications, and alternatives. The assembly is similar to FIG. 3E except that there is no top coupling-element. The assembly consists of two sections. The bottom section 110 is identical to FIG. 3E and it contains the output coupling-element 120 which consists of a dielectric post 122 made from a material such as alumina with its outer surface coated with a conductive veneer such as silver. The top section consists of the bulb (gas-filled vessel) 130 which is made from a material that is transparent to visible light such as quartz or translucent alumina. It is a key aspect of the invention that dielectric post of the output coupling-element 120 is bored to closely receive bulb 130, such that heat transfer through its dielectric center and RF coupling through its conductive outer coating take place simultaneously. The area of the dielectric post of the output coupling-element that come in contact with the bulb is not covered with a conductive veneer. Using this bulb assembly approach the high RF fields is kept away from the end of bulb resulting in a more reliable lamp. It is also a key aspect of this invention that output coupling-element 120 makes ground contact at plane 121 with the lamp body 600 depicted in FIGS. 2A, 2B, and 2C.

The portion of body 110 that is received by the lamp body 600 as depicted in FIGS. 2A, 2B, and 2C (and overlaps with the length of input coupling-element 630) and is shown in FIG. 3G as being below the dashed line 140; is not coated with a conductive layer. The portion of body 110 that is above the lamp body 600 but substantially below the bulb 130 is depicted schematically as the area between 140 and 141; this portion may be coated with a conductive veneer 117. The purpose of the conductive coatings is to shield against unwanted electromagnetic radiation. An example embodiment of conductive veneer 117 is silver paint. Alternatively, instead of a conductive veneer, portion of the body 110 between 140 and 141 can be covered by a metal ring 650 as part of the extension of lamp body 600 as depicted in FIG. 4.

FIG. 3H is a side-cut view of an integrated bulb/output coupling-element assembly 100 shown in FIG. 3G. This diagram is merely an example, which should not unduly limit the scope of the claims herein. One of ordinary skill in the art would recognize other variations, modifications, and alternatives. The assembly is similar to FIG. 3F except that there is no top coupling-element.

Figure 3J:
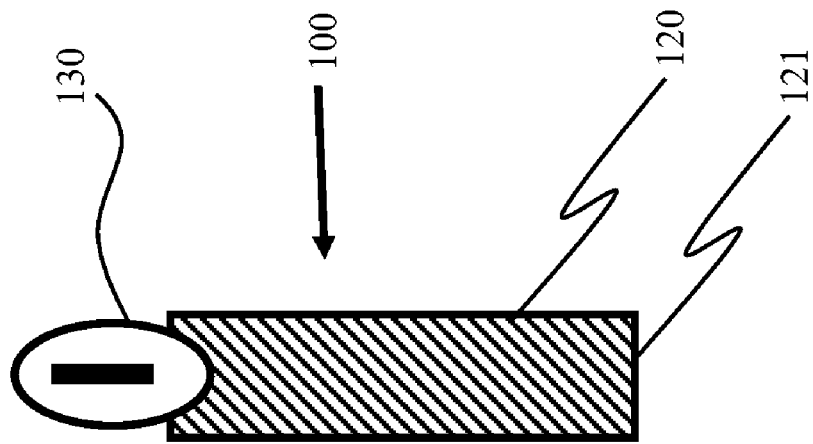
FIG. 3J is a side-cut view of the alternated integrated bulb/output coupling element assembly shown in FIG. 3I comprising of an output coupling-element made from metal and recessed to receive the gas-filled vessel (bulb).
Figure 3I:
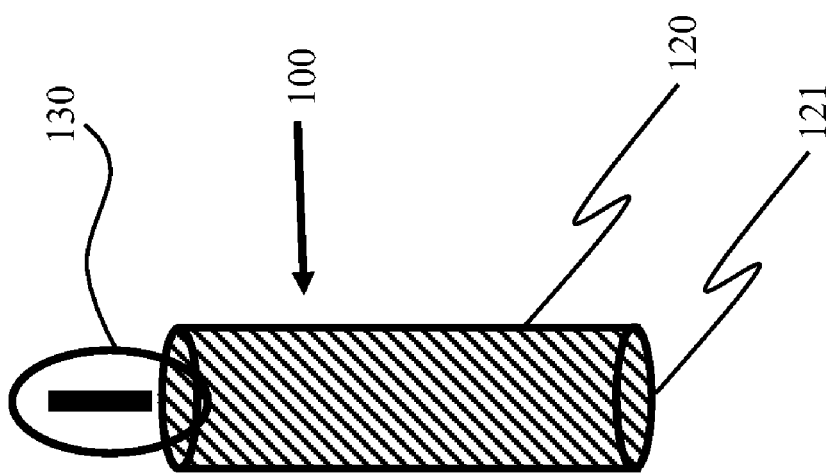
FIG. 3I is a perspective view of an alternate integrated bulb/output coupling-element assembly to the one in FIG. 3G comprising of an output coupling-element made from metal and recessed to receive the gas-filled vessel (bulb).

FIG. 3I is a perspective view of an alternative design for an integrated bulb/output coupling-element assembly 100 which is the same as the assembly depicted in FIG. 2D. The assembly is made using a solid conductor (metal post) 120 and is recessed at the top to closely receive one end of the gas-filled vessel 130. The other end of metal post 121 is grounded to the lamp body. A thin layer of dielectric material or refractory metal such as molybdenum can be used as interface between the bulb and the metal post. Alternatively the top part of the metal post or all of the metal post can be made from a refractory metal with its outer surface covered with a layer of metal with high electrical conductivity such as silver or copper. The metal post can also be hollow inside. The assembly has no top coupling element.

FIG. 3J is a side-cut view of an integrated bulb/output coupling-element assembly 100 shown in FIG. 3I. The bulb/output coupling-element is similar to FIG. 3H except the post is made from a solid conductor instead of a dielectric material covered with conductive layer. This diagram is merely an example, which should not unduly limit the scope of the claims herein. One of ordinary skill in the art would recognize other variations, modifications, and alternatives.

FIG. 4 is a perspective view of the lamp body/metallic enclosure of the lamp shown in FIGS. 2A, 2B, 2C, and 2D. This diagram is merely an example, which should not unduly limit the scope of the claims herein. One of ordinary skill in the art would recognize other variations, modifications, and alternatives. The lamp body/metallic enclosure consists of two sections a bottom section 600 and a top section 650. The bottom section of the lamp body is cylindrical in this case but it also can be made in rectangular or other shapes as well. The top portion of the lamp body is in the form of a metallic ring but it can be in the form of a rectangle/square as well. The lamp body is made from a metal such as aluminum or copper. The lamp body can be made from multiple pieces and attached together using screws or by soldering or welding or other techniques. Inside of the lamp body 638 is hollow and it receives the integrated bulb/output coupling-element assembly 100 (FIGS. 3A, 3C, 3E, 3G, and 3I) through holes 610 and 510. The output coupling-element 120 and top coupling-element 125 are electrically connected to the lamp body which is connected to ground. There are also holes in the lamp body 611 and 612 to receive the input coupling-element 630 and the feedback coupling-element 635 shown in FIGS. 2A, 2B, 2C, and 2D. The two coupling-elements will not touch the walls of lamp body at the bottom. However, the input coupling-element 630 will protrude through the hole 731 at the top surface of lamp body 600 and connects to the lamp body which is connected to ground.

Figure 5A:
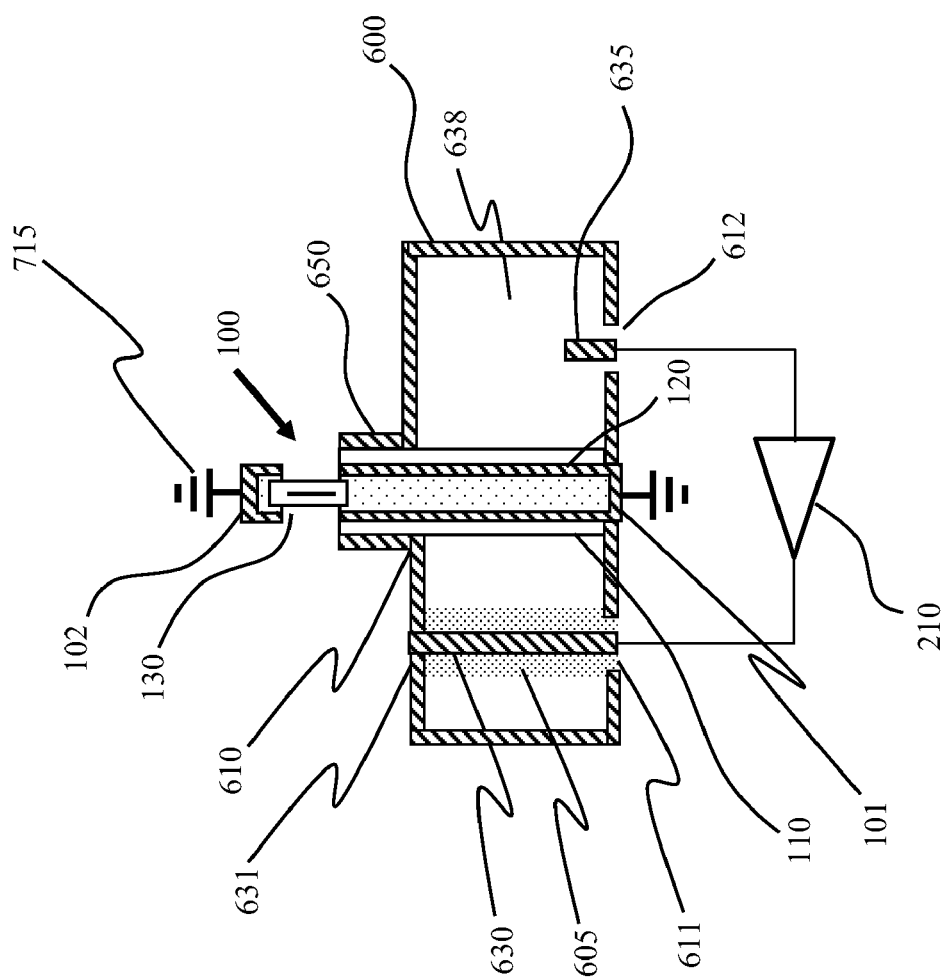
FIG. 5A is a simplified side cut view of an alternate electrodeless lamp design, employing the conductive lamp body shown in FIG. 4 and the integrated bulb/output coupling-element assembly shown in FIG. 3D according to an embodiment of the present invention. The inside of lamp body is filled with air and a dielectric layer is used around the input coupling-element to prevent arcing.

FIG. 5A is a side cut view of an alternate electrodeless lamp design, employing the lamp body/metallic enclosure shown in FIG. 4 and the integrated bulb/output coupling-element assembly shown in FIG. 3E. This diagram is merely an example, which should not unduly limit the scope of the claims herein. One of ordinary skill in the art would recognize other variations, modifications, and alternatives. The inside of lamp body 638 is substantially hollow. A dielectric layer 605 such as Teflon can be used around the input coupling-element 630 to prevent arcing. The end of the input coupling-element 631 is connected to the lamp body which is connected to ground. The lamp assembly is also connected to ground at planes 101 and 102. The lower section of the lamp assembly 110 which is inside lamp body 600 is not covered with any metal. This allows RF energy to be coupled from the input coupling-element 630 to the output coupling-element 120. The coupling and the impedance match to the bulb depends on the separation between the two coupling-elements and their dimensions including length and diameter. The resonant frequency of the lamp body and lamp assembly is strongly dependent on the length of the output coupling-element and is less dependent on the diameter of the cylindrical lamp body. Feedback coupling-element 635 is closely received by the lamp body 600 through opening 612, and as such is not in direct DC electrical contact with the lamp body 600. The shorter feedback E-field coupling-element 635 couples a small amount of RF energy from the bulb/coupling-element assembly 100 and provides feedback to the RF amplifier 210. While the configuration shown in FIG. 5A is a feedback configuration similar to FIG. 2A it is also possible to implement this design using a no-feedback configuration similar to FIG. 2B.

Figure 5B:
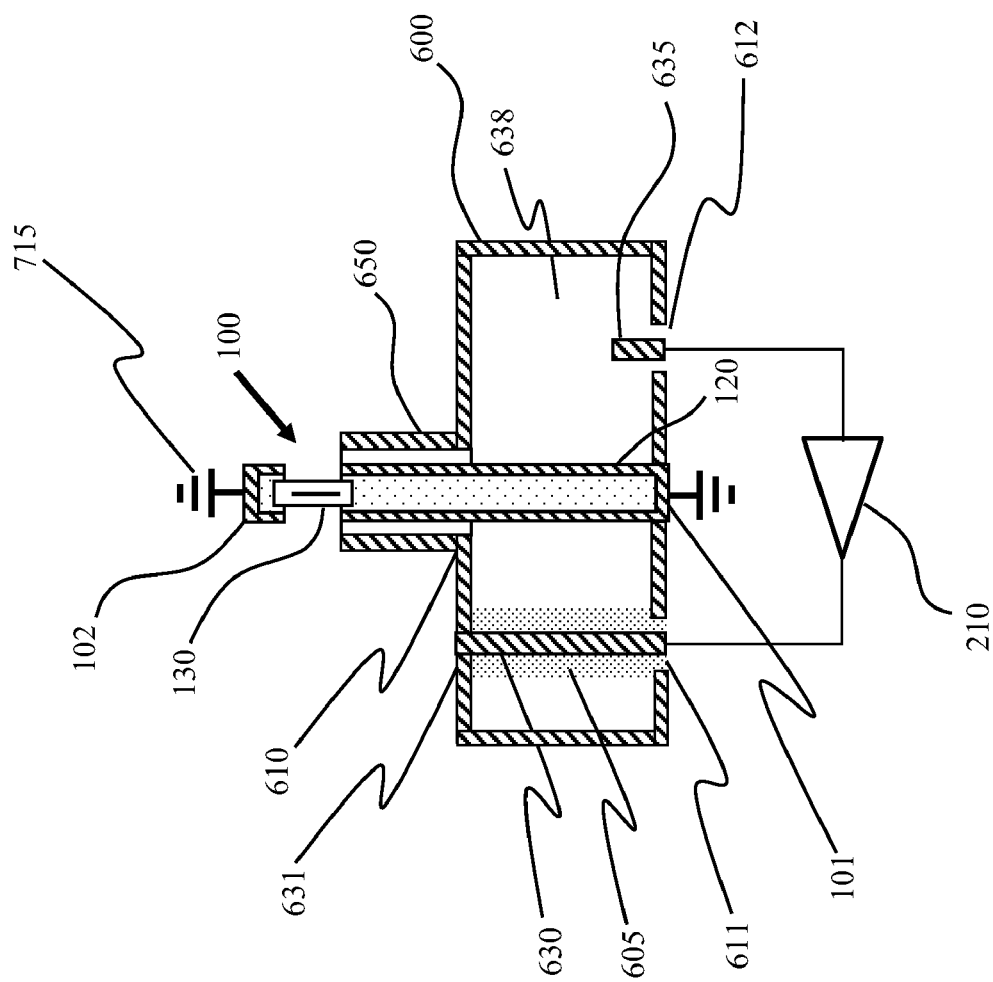
FIG. 5B is a simplified side cut view of a modified lamp design shown in FIG. 5A. Part of the dielectric layer around the output coupling-element of the bulb assembly has been removed according to an embodiment of the present invention.

FIG. 5B is a side cut view of an alternate electrodeless lamp design to the one shown in FIG. 5A. This diagram is merely an example, which should not unduly limit the scope of the claims herein. One of ordinary skill in the art would recognize other variations, modifications, and alternatives. This design is similar except part of the dielectric layer 110 (such as a quartz tube) shown in FIG. 5A surrounding the output coupling-element 120 inside the bottom section of the lamp body 600 has been removed.

Figure 5C:
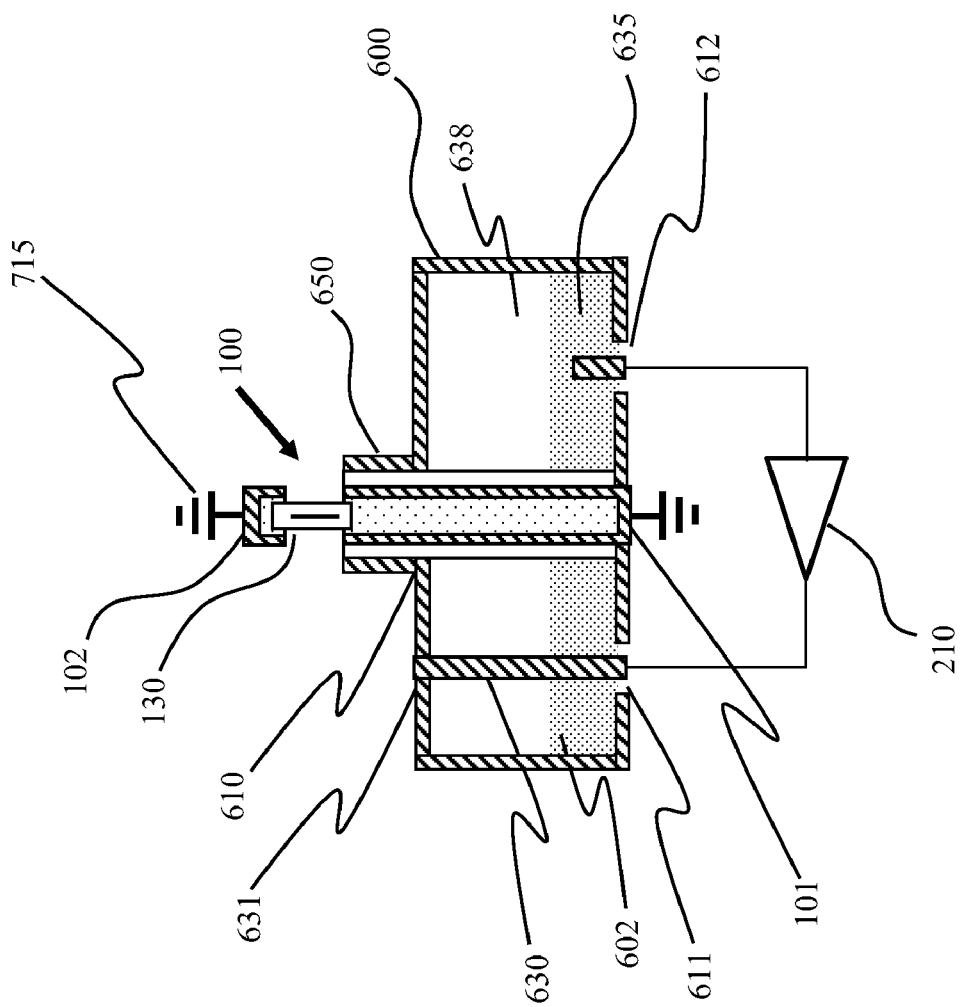
FIG. 5C is a simplified side cut view of an alternate lamp design shown in FIG. 5A. The lower part of the lamp body is partially filled with dielectric according to an embodiment of the present invention.

FIG. 5C is a side cut view of an alternate electrodeless lamp design to the one shown in FIG. 5A. This diagram is merely an example, which should not unduly limit the scope of the claims herein. One of ordinary skill in the art would recognize other variations, modifications, and alternatives. This design is similar except that the lamp body 600 is partially filled with dielectric 602 in the lower part of the lamp body.

Figure 5D:
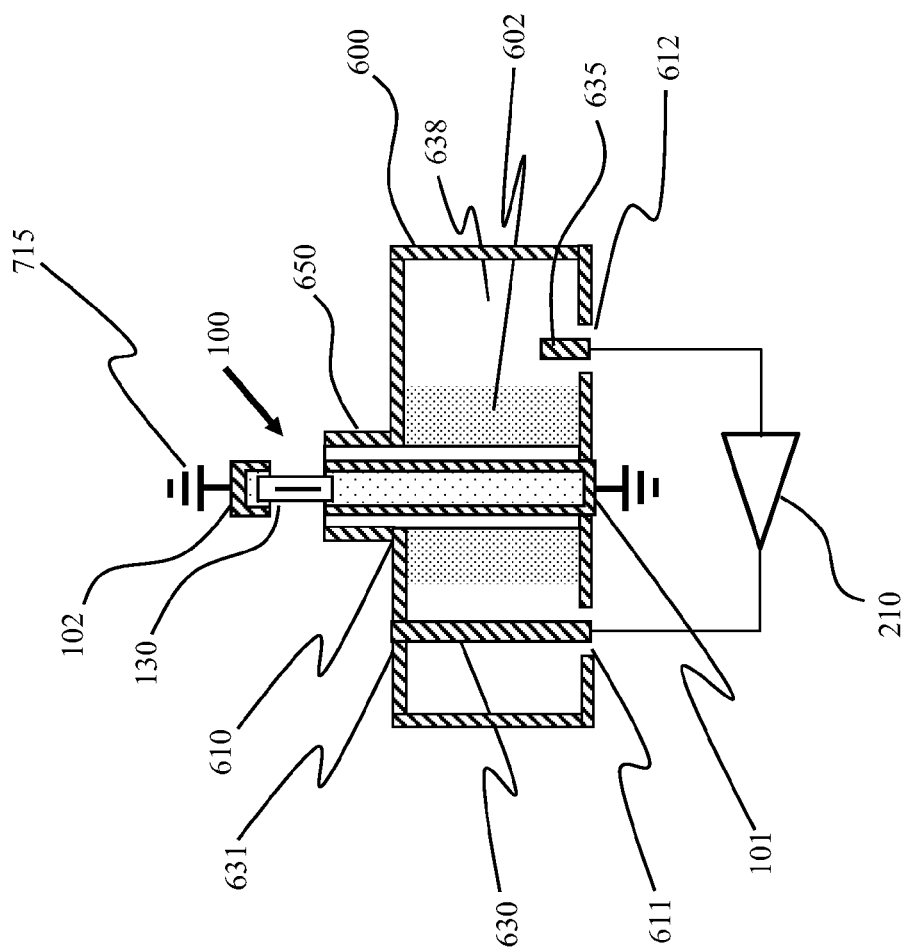
FIG. 5D is a side cut view of an alternate lamp design shown in FIG. 5A. The lower part of the lamp body is partially filled with dielectric according to an embodiment of the present invention.

FIG. 5D is a side cut view of an alternate lamp design to the one shown in FIG. 5C. This diagram is merely an example, which should not unduly limit the scope of the claims herein. One of ordinary skill in the art would recognize other variations, modifications, and alternatives. This design also has a lamp body 600 that is partially filled with dielectric except in this case the dielectric layer is cylindrical surrounding the output coupling-element of lamp assembly. It is also possible that the lamp body is completely filled with a dielectric.

It is shown through electromagnetic simulation that the two significant advantages of the lamp design depicted in FIGS. 2A, 2B, 2C, and 2D—namely, that the resonant frequency is strongly dependent on the lengths of the input and output coupling-elements while being less dependent on the diameter of the lamp body 600, and that the RF power coupled to the bulb 130 is strongly dependent on the physical separation between the input coupling-element 630 and the output coupling-element within the bulb/output coupling-element assembly 100—are retained in the design depicted in FIGS. 5A, 5B, and 5C. It can also be appreciated by one of ordinary skill in the art that the distributed RF oscillator configuration depicted in FIGS. 5A, 5B, and 5C—involving a feedback coupling-element 635, and amplifier 210, and an input coupling-element 630 forming a positive feedback loop around the bulb/output coupling-element assembly 100, similar to that configuration depicted in FIG. 2A—can be substituted with the lumped RF source configuration depicted in FIG. 2B with no substantive change to the invention.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An electrodeless plasma lamp comprising:
   a conductive housing having a spatial volume defined within the conductive housing, the spatial volume having an inner region and an outer region;
   a gas-filled vessel having a transparent or translucent body having an inner surface and an outer surface and a cavity formed within the inner surface, the gas-filled vessel comprising a first end region and a second end region and a length defined between the first end region and the second end region;
   a first coupling-element spatially disposed within the conductive housing coupled to the first end region of the gas-filled vessel, the other end of the first coupling-element being electrically connected to the conductive housing;
   an RF source coupling-element spatially disposed within the conductive housing and within a predetermined distance from the first coupling-element, a first end of the RF source coupling-element being electrically connected to the conductive housing, a second end of the RF source coupling-element comprising an input;
   a gap provided between the RF source coupling-element and the first coupling-element, the gap provided by the predetermined distance;
   an RF source comprising an output, the output of the RF source being coupled to the first coupling-element through the gap and the RF source coupling-element, the output of the RF source being coupled to the input of the RF source coupling-element.

2. The lamp of claim 1 wherein the electromagnetic energy is at least capacitively, or inductively, or a combination of capacitively and inductively coupled to the gas-filled vessel.

3. The lamp of claim 1 wherein the gas-filled vessel comprises a noble gas and one or more species capable of discharging light.

4. The lamp of claim 1 wherein the first coupling-element comprises a first coupling-element end and a second coupling-element end, the first coupling-element end being coupled to the first end region of the gas-filled vessel, the second coupling-element end being directly connected to a ground potential.

5. The lamp of claim 1 wherein the first end of the RF source coupling-element is connected to a ground potential.

6. The lamp of claim 1 wherein the spatial volume is substantially vacuum or substantially comprises a mixture of one or more gases.

7. The lamp of claim 1 wherein the spatial volume is substantially a dielectric material.

8. An electrodeless plasma lamp comprising:
   a conductive housing having a spatial volume defined within the conductive housing, the spatial volume having an inner region and an outer region;
   a gas-filled vessel having a transparent or translucent body having an inner surface and an outer surface and a cavity formed within the inner surface, the gas filled vessel comprising a first end region and a second end region and a length defined between the first end region and the second end region;
   a first coupling-element spatially disposed within the inner region of the conductive housing coupled to the first end region of the gas-filled vessel, the other end of the first coupling-element being electrically connected to the conductive housing;
   an RF source coupling-element spatially disposed within the outer region of the conductive housing and within a predetermined distance from the first coupling-element, one end of the RF source coupling-element being electrically connected to the conductive housing;
   a gap provided between the RF source coupling-element and the first coupling-element, the gap being formed by the predetermined distance;
   an RF source comprising an output, the output of the RF source being coupled to the first coupling-element through the gap and the RF source coupling-element.

9. The lamp of claim 8 wherein the RF source is at least capacitively, or inductively, or a combination of capacitively and inductively, coupled to the first coupling-element through the gap and the RF source coupling-element.

10. The lamp of claim 8 wherein the electromagnetic energy is at least capacitively, inductively, or a combination of capacitively and inductively coupled to the gas-filled vessel.

11. The lamp of claim 8 wherein the RF source coupling-element further comprising an input, the output of the RF source being coupled to the input of the RF source coupling-element.

12. The lamp of claim 8 wherein the first coupling-element comprises a first coupling-element end and a second coupling-element end, the first coupling-element end being coupled to the first end region of the gas-filled vessel, the second coupling-element end being connected to a ground potential.

13. The lamp of claim 8 wherein the RF source coupling-element comprises a first coupling-element end and a second coupling-element end, the first coupling-element end being connected to the output of the RF source, the second coupling-element end being directly connected to a ground potential.

14. The lamp of claim 8 further comprising a second coupling-element, the second coupling-element comprises a first coupling-element end and a second coupling-element end, the first coupling-element end being coupled to the second end region of the gas-filled vessel, the second coupling-element end being directly coupled to a ground potential.

15. The lamp of claim 8 wherein the spatial volume is substantially vacuum or substantially comprises a mixture of one or more gases.

16. The lamp of claim 8 wherein the spatial volume is substantially a dielectric material.

17. The lamp of claim 8 further comprising a feedback coupling-element disposed within a portion of the outer region of the spatial volume of the conductive housing, the feedback coupling-element being configured to transmit an indication to the RF source.

18. The lamp of claim 8 wherein the conductive housing is configured in a cylindrical shape, a rectangular shape, an annular shape, a square shape, a triangular shaped, a polygon shaped, a pyramidal shape, an egg shape, or any combination of these shapes.

19. The lamp of claim 8 wherein the conductive body is metallic, the conductive body being configured to confine electromagnetic energy within the spatial volume and being configured as a guiding structure for the electromagnetic energy.

20. The lamp of claim 19 wherein the conductive body further comprises a dielectric insert.

* * * * *